(12) United States Patent
Nguyen et al.

(10) Patent No.: US 9,980,156 B2
(45) Date of Patent: May 22, 2018

(54) OPTIMIZATION OF DOWNLINK THROUGHPUT

(71) Applicants: Si Nguyen, Tewksbury, MA (US); Anil Kumar Bhandari, Powai (IN)

(72) Inventors: Si Nguyen, Tewksbury, MA (US); Anil Kumar Bhandari, Powai (IN)

(73) Assignee: ALTIOSTAR NETWORKS, INC., Tewksbury, MA (US)

( * ) Notice: Subject to any disclaimer, the term of this patent is extended or adjusted under 35 U.S.C. 154(b) by 185 days.

(21) Appl. No.: 14/802,633

(22) Filed: Jul. 17, 2015

(65) Prior Publication Data

US 2017/0019803 A1    Jan. 19, 2017

(51) Int. Cl.
| | | |
|---|---|---|
| H04J 1/16 | (2006.01) | |
| H04W 24/02 | (2009.01) | |
| H04L 29/06 | (2006.01) | |
| H04L 12/26 | (2006.01) | |
| H04W 76/02 | (2009.01) | |
| H04L 12/801 | (2013.01) | |
| H04W 28/02 | (2009.01) | |
| H04L 12/823 | (2013.01) | |

(52) U.S. Cl.
CPC ......... *H04W 24/02* (2013.01); *H04L 43/0864* (2013.01); *H04L 47/193* (2013.01); *H04L 69/16* (2013.01); *H04W 76/02* (2013.01); *H04L 47/323* (2013.01); *H04W 28/0284* (2013.01)

(58) Field of Classification Search
CPC . H04W 24/02; H04W 76/02; H04W 28/0284; H04L 43/0864; H04L 47/193; H04L 47/323; H04L 69/16
USPC ........................................................ 370/252
See application file for complete search history.

(56) References Cited

U.S. PATENT DOCUMENTS

| | | | |
|---|---|---|---|
| 8,379,515 B1 * | 2/2013 | Mukerji | H04L 47/323 370/229 |
| 2006/0029037 A1 * | 2/2006 | Chen | H04L 29/06027 370/351 |
| 2006/0133281 A1 * | 6/2006 | Witherell | H04L 1/1854 370/238 |
| 2011/0086658 A1 * | 4/2011 | Baldemair | H04J 13/0059 455/507 |

(Continued)

FOREIGN PATENT DOCUMENTS

EP    1432207 A2    6/2004

OTHER PUBLICATIONS

International Search Report and Written Opinion for Application No. PCT/US2016/042614, dated Oct. 17, 2016.

*Primary Examiner* — Peter Cheng
(74) *Attorney, Agent, or Firm* — Mintz Levin Cohn Ferris Glovsky and Popeo, P.C.

(57) ABSTRACT

A device, a method, a system, and a computer program product for transmitting data packets are disclosed. A communication link between a first device and a second device is established in accordance with a transmission control protocol for transmission of a data packet between the first device and the second device. The communication link is monitored during transmission of the data packet from the second device to the first device. Based on the monitoring, at least one correction of the communication link is performed during transmission of an acknowledgement of a receipt of the data packet by the first device to the second device.

36 Claims, 25 Drawing Sheets

(56) References Cited

U.S. PATENT DOCUMENTS

2013/0013791 A1  1/2013  Kotecha et al.
2013/0235843 A1* 9/2013  Gohari ................ H04W 80/06
                                                370/331

* cited by examiner

# OPTIMIZATION OF DOWNLINK THROUGHPUT

TECHNICAL FIELD

In some implementations, the current subject matter described herein generally relates to optimization of downlink throughput in a communications system, such as in long term evolution wireless communications systems.

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide guaranteed bandwidth within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. LTE is based on the GSM/EDGE and UMTS/HSPA digital cellular technologies and allows for increasing capacity and speed by using a different radio interface together with core network improvements.

Communications links typically connect endpoint devices (e.g., mobile telephones, personal computers, servers, etc.) so that devices can transmit data to one another. Data transmissions are typically governed by various protocols that are specified in the Internet protocol suite, which includes the networking model and a set of communications protocols used for the Internet and/or similar networks. The Internet protocol suite is typically referred to as TCP/IP and contains its most important protocols: the Transmission Control Protocol ("TCP") and the Internet Protocol ("IP"). The TCP/IP model and protocols are maintained by the Internet Engineering Task Force ("IETF"). TCP/IP provides end-to-end connectivity specifying how data should be formatted, addressed, transmitted, routed and received at the destination endpoint device. TCP/IP protocols are organized into the following four abstraction layers (from lowest to highest): the link layer (containing communication technologies for a single network segment (link)), the internet layer (connecting independent networks to establish internetworking), the transport layer (handling process-to-process communication), and the application layer (providing interfaces to the user and support services).

In view of large amounts of data that are typically transmitted to and/from endpoint devices in existing wireless communications systems, such systems and/or associated endpoint devices are affected by various problems, such as data loss, congestion, redundant transmissions, battery power loss (e.g., in user equipment), and others. Thus, there is a need to provide a wireless communication system that is capable of providing an efficient, cost-effective and reliable transmission of data between endpoint devices using TCP.

SUMMARY

In some implementations, the current subject matter relates to a computer-implemented method for transmission of data packets. The method can include establishing a communication link between a first device and a second device in accordance with a transmission control protocol for transmission of a data packet between the first device and the second device; monitoring the communication link during transmission of the data packet from the second device to the first device; and performing, based on the monitoring, at least one correction of the communication link during transmission of an acknowledgement of a receipt of the data packet by the first device to the second device. At least one of the establishing, the monitoring, and the performing can be performed using at least one processor of at least one computing system.

In some implementations, the current subject matter can include one or more of the following optional features. An evolved node ("eNodeB") base station can perform at least one of the establishing, the monitoring and the performing, the eNodeB base station comprising the at least one processor and the at least one memory. The method can also include storing, using the at least one memory, data packets received from the second device, the stored data packets include at least one transmission control protocol (TCP) data packet. The method can include transmitting at least one data packet stored in the at least one memory from the base station to the first device, and receiving at least one acknowledgement from the first device indicating that the data packet is received by the first device.

In some implementations, the monitoring can include determining, using the at least one processor, a smoothed TCP air-interface round trip time ("SARTT") information for the data packet, the round trip time ("RTT") information includes time taken by a transmission of the data packet to the first device and a transmission of a TCP acknowledgement by the first device indicative of the receipt of the data packet. A smoothed L2 air-interface round trip time information for the data packet can be also determined based on a layer 2 acknowledgement information. The difference between the determined TCP smoothed round trip time information and the determined L2 smoothed round trip time information can be compared to a first threshold value and a second threshold value, the first threshold value being greater than the second threshold value. This methodology of detecting downlink throughput deterioration can be advantageous in that it can only be at the eNodeB. Downlink throughput by itself might not be used as a metric because target throughputs are not known a priori for TCP flows. The achievable throughput can depend on RTT being experienced by individual flows making it impossible to use a TCP throughput as a metric for downlink deterioration. TCP layer RTT by itself might also not be a useful metric because RTT might grow due to additional delays, e.g., due to eNodeB loading. The current subject matter system can resolve these issues by using the difference between TCP and L2 air-interface RTT. Thus, any growth in this difference can be due to TCP layer issues and can automatically exclude any L2 delays.

In some implementations, at least one correction can be performed when the difference is at least one of the following: greater than the first threshold value, and/or lower than the second threshold value. The correction is not performed when the difference between the determined round trip time information and the determined smoothed round trip time information is greater than the second threshold value and lesser than the first threshold value.

In some implementations, the correction can include at least one of the following: delaying transmission of an acknowledgement that the data packet was received by a second device, dropping transmission of at least one data packet from the first device to the second device, reducing size of a data packet receive window provided to the first device from the second device, providing an explicit congestion notification information to second device, and generating an acknowledgement from the at least one processor indicating that the packet was received by the first device. The transmission of an acknowledgement that the data packet was received can be delayed by a greater amount of time when the difference between the determined round trip time information and the determined smoothed round trip time information is greater than the first threshold value. Transmission of an acknowledgement that the data packet was received can be delayed by a less amount of time when the difference between the determined round trip time information and the determined smoothed round trip time information is less than the second threshold value.

In some implementations, a number of packets dropped from transmission from the first device to the second device can be greater when the difference between the determined round trip time information and the determined smoothed round trip time information is greater than the first threshold value. The number of packets dropped from transmission from the first device to the second device can be less when the difference between the determined round trip time information and the determined smoothed round trip time information is less than the second threshold value.

In some implementations, the explicit congestion notification information can be provided when the difference between the determined round trip time information and the determined smoothed round trip time information is greater than the first threshold value.

In some implementations, the acknowledgement from the at least one processor indicating that the packet was received by the first device can be generated based on a layer 2 acknowledgement received from the first device by the at least one processor.

In some implementations, the eNodeB can be configured to send to the second device an acknowledgement indicating a receipt of the data packet by the first device upon receiving a confirmation that the data packet was received by the first device, the confirmation being generated by at least one of the following: a media access control (MAC) layer of the eNodeB, a packet data convergence protocol (PDCP) layer of the eNodeB, and a radio link control (RLC) layer of the eNodeB. The eNodeB can be further configured to schedule transmission of the data packet from the second device to the first device using the transmission control protocol.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

To address the deficiencies of currently available solutions, one or more implementations of the current subject matter relate to optimization of downlink throughput. The optimization can be performed by establishing a communication link between a user equipment and a server using a transmission control protocol for transmission of data packets. A base station (e.g. an evolved node B or eNodeB or eNB) can monitor a downlink portion of the communication link for deterioration of conditions. Once the conditions on the downlink have degraded, the base station can apply uplink treatment to prevent congestion, thereby optimizing throughput on the downlink portion of the communication link. In some implementations, the current subject matter can be implemented in a wireless communication system, such as a long term evolution system, where some of its components are discussed below.

I. Long Term Evolution Communications System

FIGS. 1a-c and 2 illustrate an exemplary conventional long term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
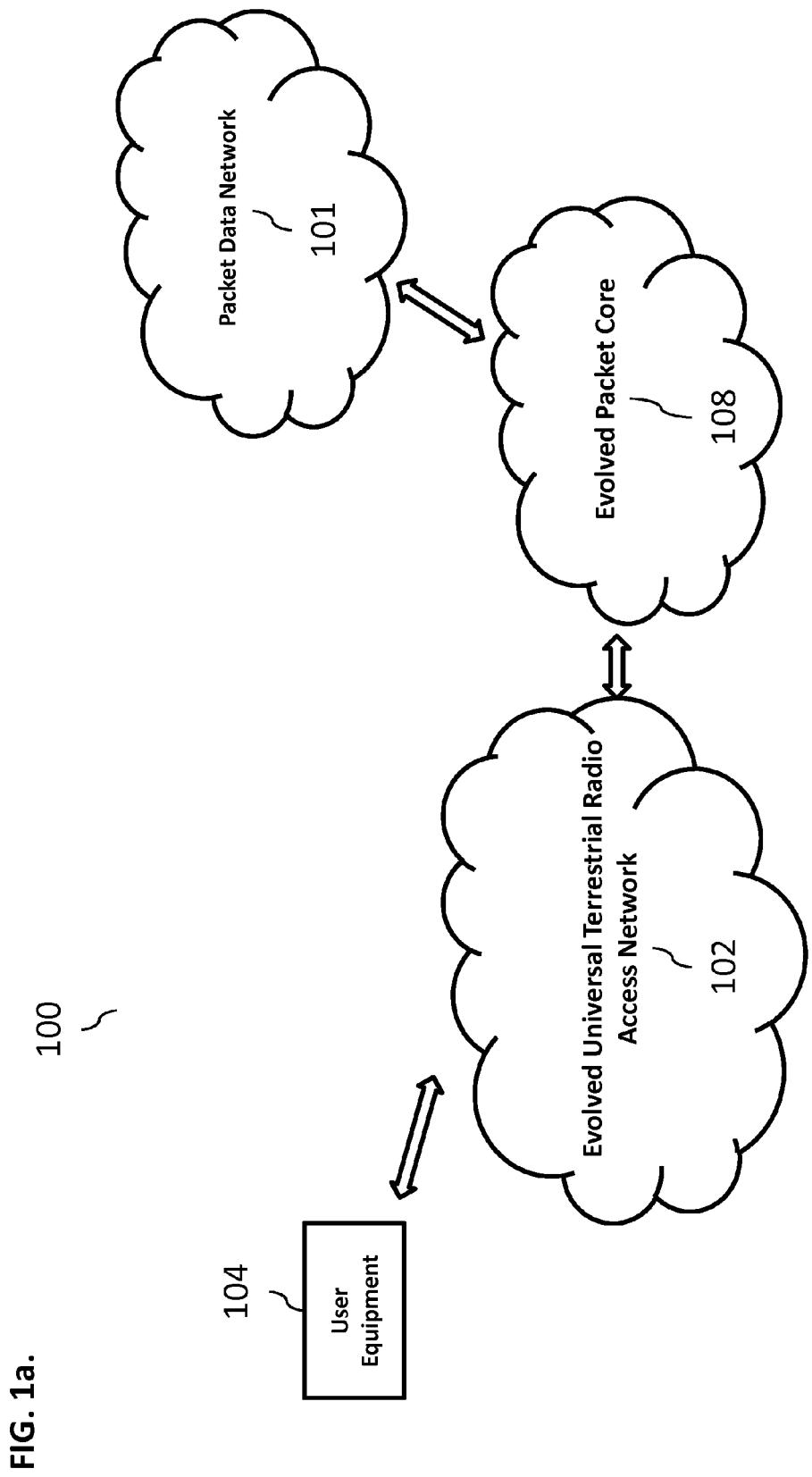
FIG. 1a illustrates an exemplary conventional long term evolution ("LTE") communications system.
Figure 1B:
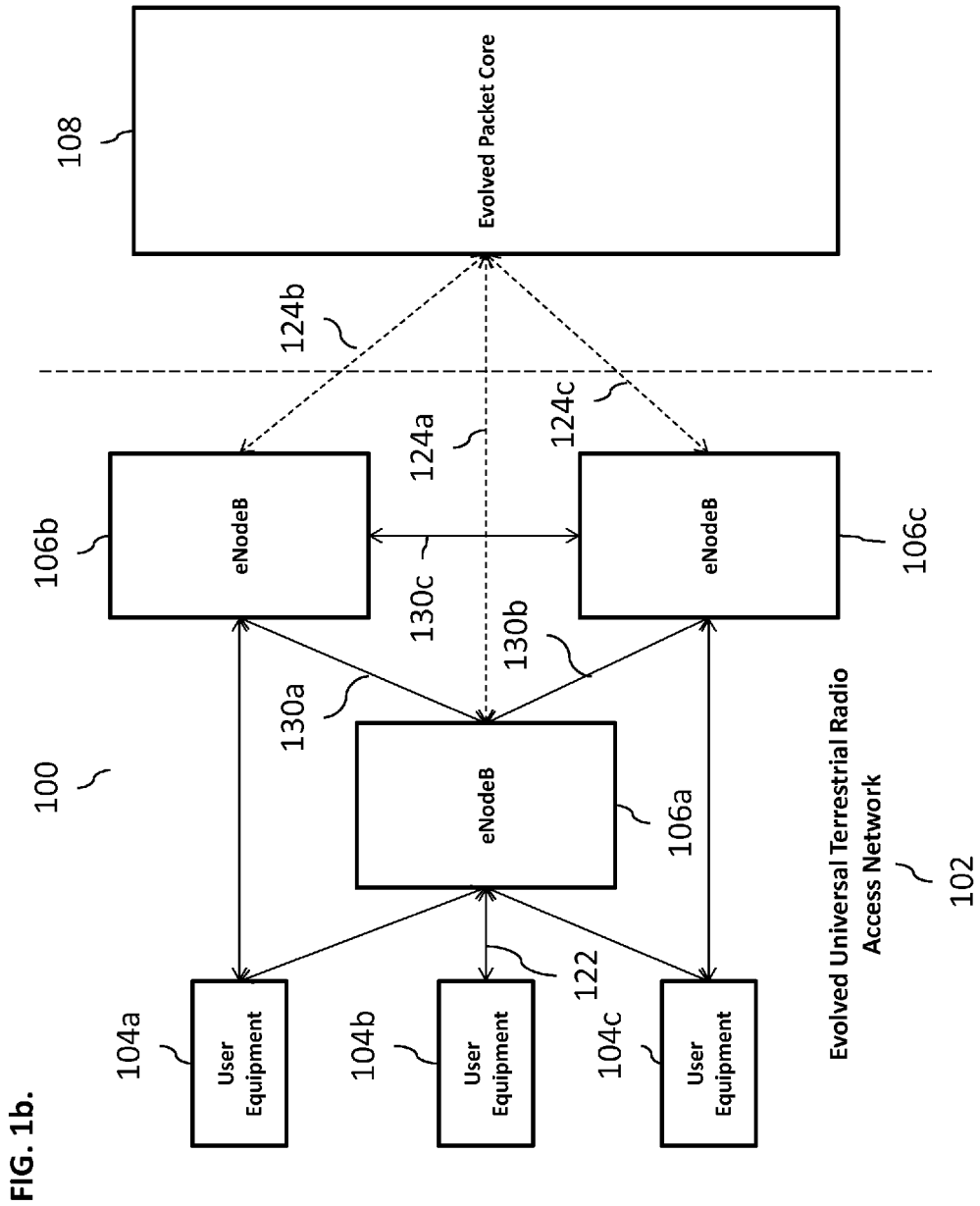

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a table, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
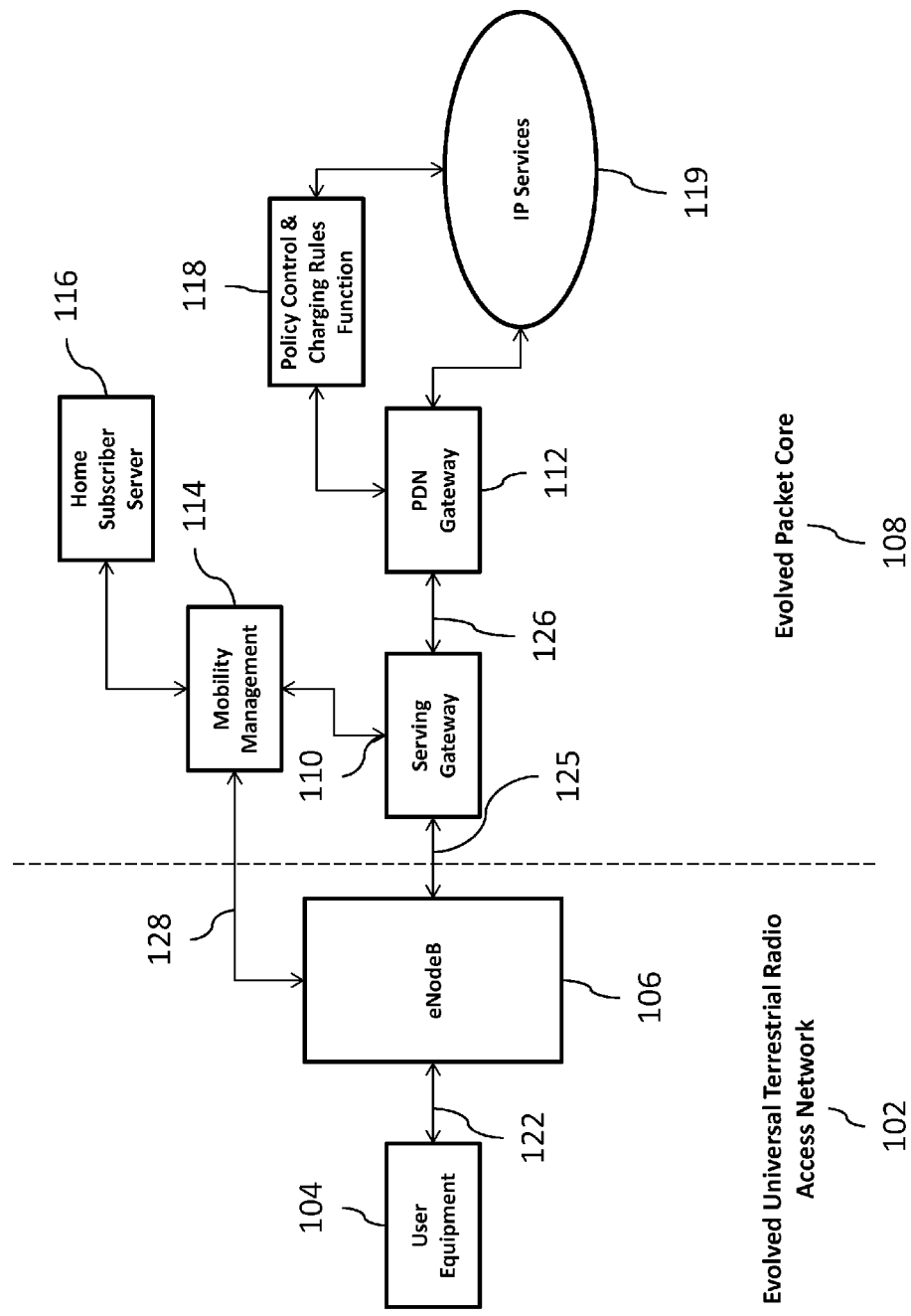

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to inter-work with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

II. eNodeB

Figure 1D:
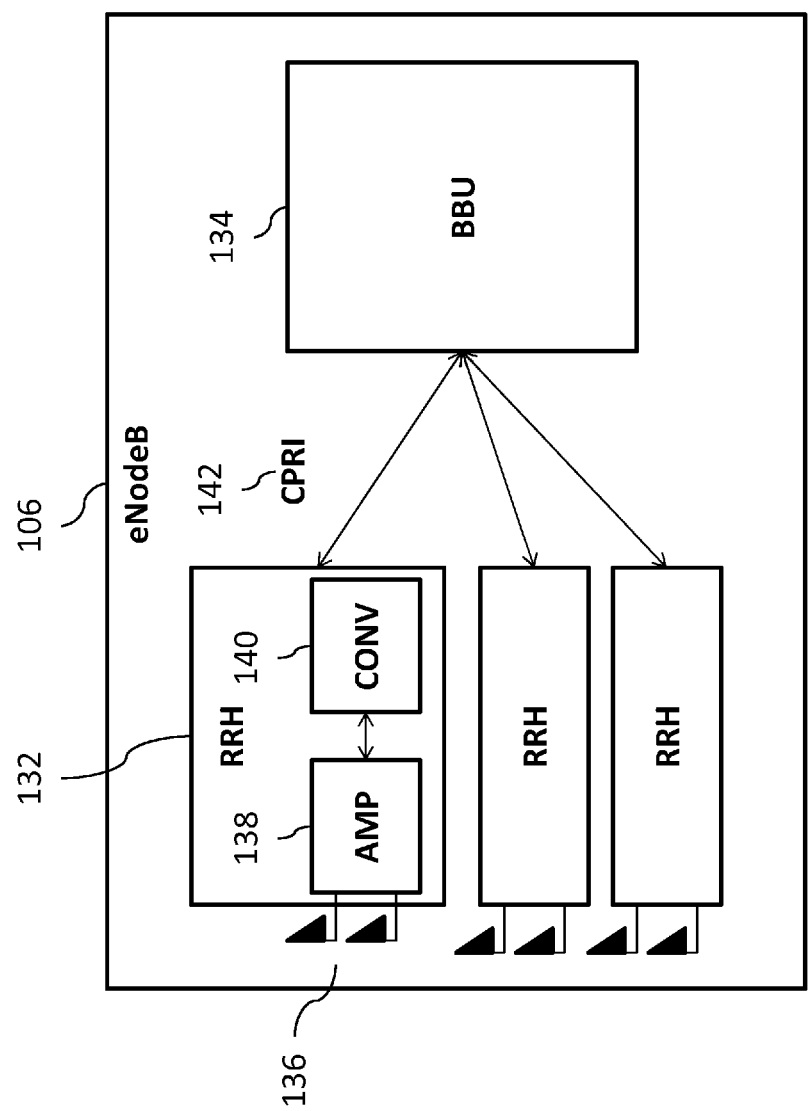

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
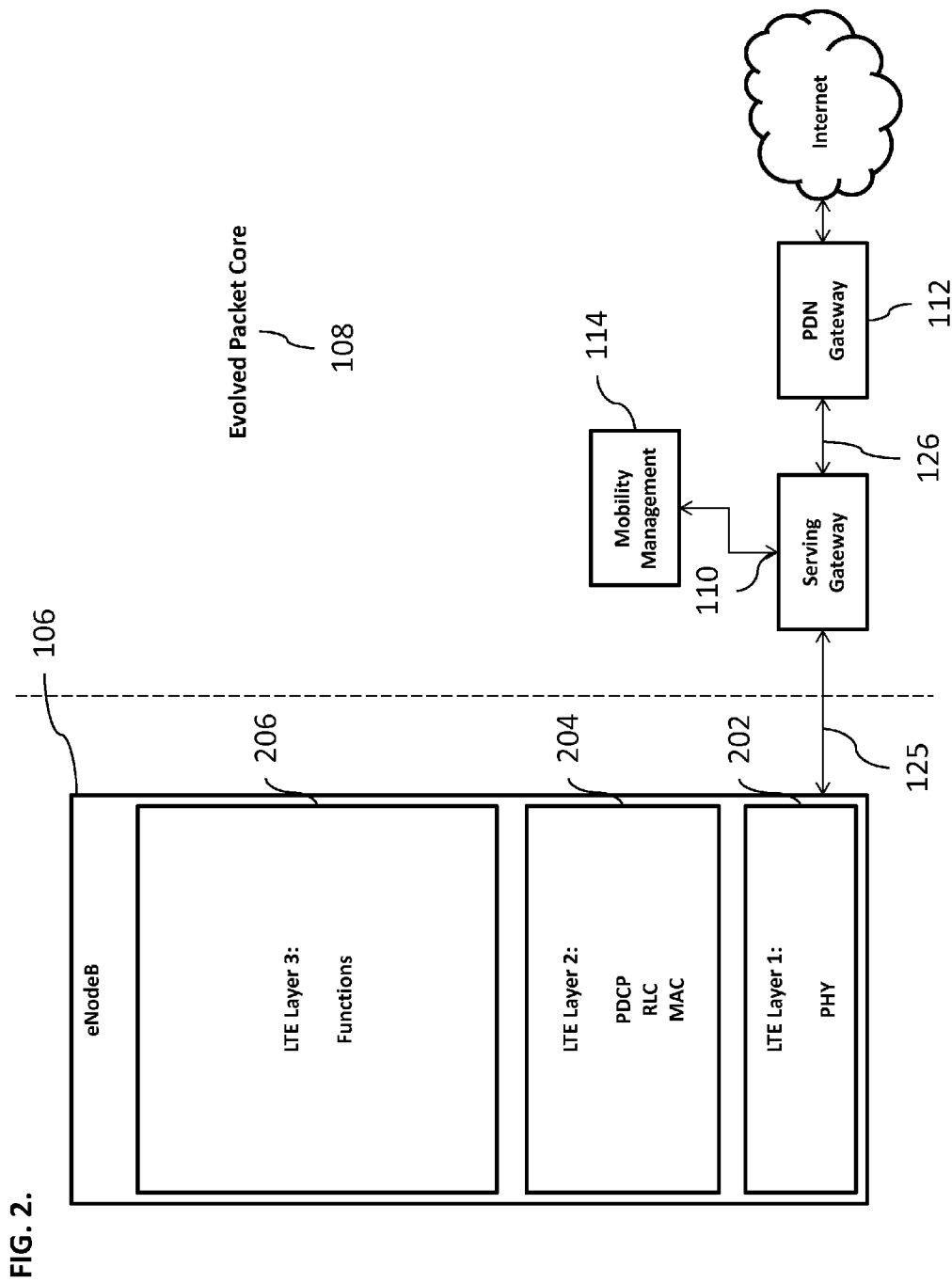
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

III. Intelligent LTE Radio Access Network

Figure 3:
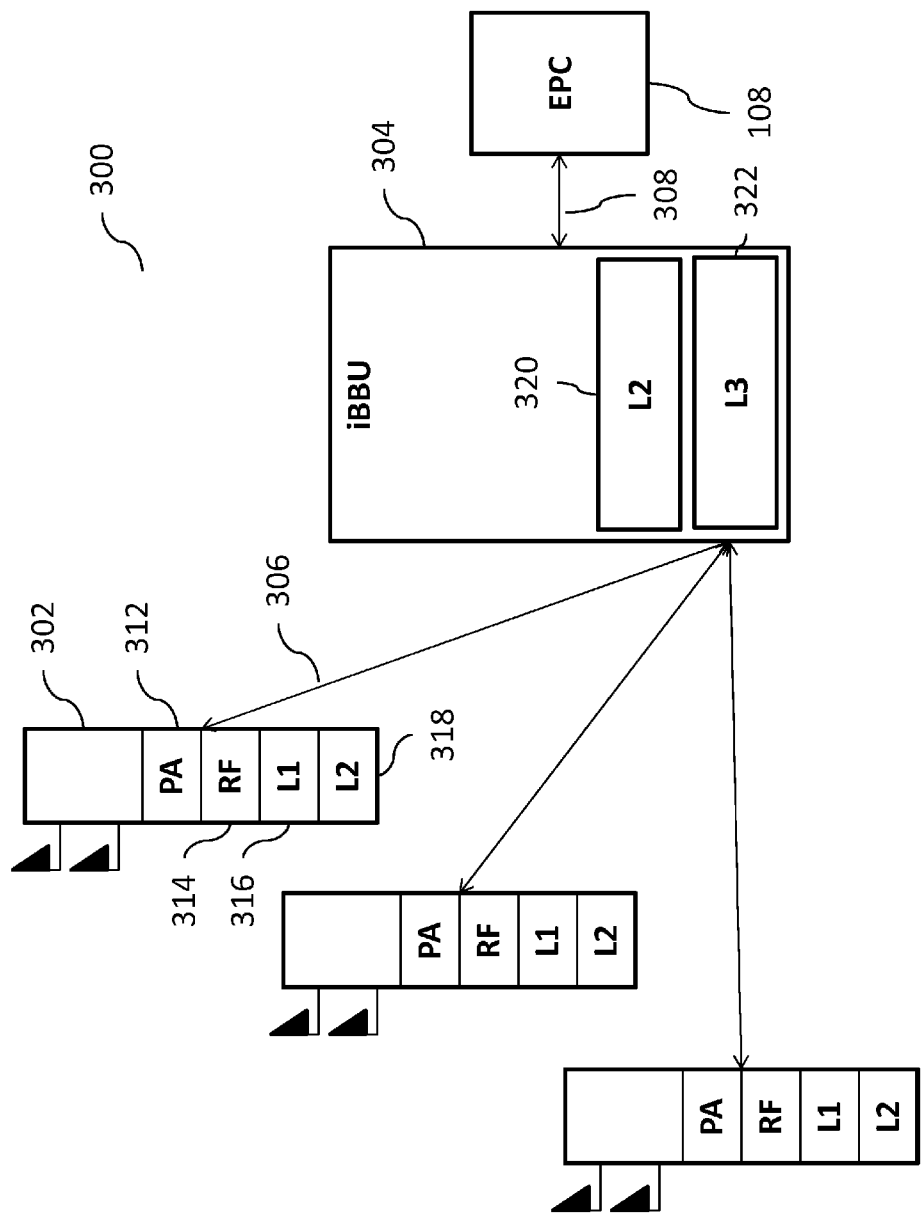
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU") 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with RLC and PDCP. Thus, the system 300 can be configured to split functionalities/protocols associated with RLC and PDCP between iRRH 302 and the iBBU 304.

IV. TCP in Intelligent LTE Radio Access Network

In some implementations, the current subject matter system can be configured to implement and/or otherwise use transmission control protocol ("TCP") for the purposes of data transmissions between a user equipment and a server via an eNodeB. The eNodeB can be configured to handle TCP transmissions and can include a TCP processor that can act as a component for managing such data transmissions.

TCP is considered as one of the core protocols of the Internet protocol suite ("IP") and provides reliable, ordered, error-checked delivery of a stream of octets between programs running on devices that can be connected to a network (e.g., a local area network, intranet or the public Internet. TCP resides in the transport layer. TCP accepts data from a data stream, divides it into chunks, and adds a TCP header, which creates a TCP segment. The TCP segment is then encapsulated into an IP datagram and exchanged with peer devices.

A TCP segment includes a TCP header and a data section. The TCP header contains ten mandatory fields and an optional extension field. The data section follows the header and includes payload data carried for an application. The length of the data section is calculated by subtracting the combined length of the TCP header and the encapsulating IP header from the total IP datagram length (as specified in the IP header). Web browsers or other applications use TCP, when they connect to servers on the World Wide Web, to deliver payload data (e.g., email, files, etc.) and/or transfer files from one location to another.

TCP protocol operations include three phases: connection establishment, data transfer, and connection termination. Connection establishment involves a multi-step handshake process which is followed by the data transfer phase. After data transmission is completed, the connection termination phase closes established virtual circuits and releases all allocated resources. TCP connections are managed by an operating system through a programming interface that represents an endpoint for communications, i.e., an Internet socket.

To establish a connection, TCP uses a three-way handshake. However, before a client (e.g., a software application, an endpoint device (e.g., a personal computer, a wireless device, a server, etc.)) can connect to a server, the server performs a passive open procedure (i.e., binding to and listening at a port to open it up for connections). Once established, the client application initiates an active open. During the active open, the three-way handshake includes: sending a SYN packet from the client to the server, where the client sets the segment's sequence number to a random value; sending a SYN-ACK packet from the server in reply, where the packet includes an acknowledgment number that is set to one more than the received sequence number and a sequence number chosen by the server for the packet, where the sequence number is another random number; and sending an ACK packet from the client back to the server. In the ACK packet, the sequence number is set to the received acknowledgement value and the acknowledgement number is set to one more than the received sequence number.

To terminate a connection, a four-way handshake is used, where each side (client and server) terminates connection independently. When an endpoint device wishes to stop its half of the connection, it transmits a FIN packet, where the other endpoint device acknowledges with an ACK packet. Thus, connection termination typically includes a pair of FIN and ACK packets from each TCP endpoint device.

Transmission of data using TCP can occur between devices in wired and/or wireless communications networks. To allow use of the TCP for data transmission purposes between user equipment in a wireless network (such as networks discussed in connection with FIGS. 1a-3 above) and servers, a TCP processor can be included in the eNodeB.

Figure 4:
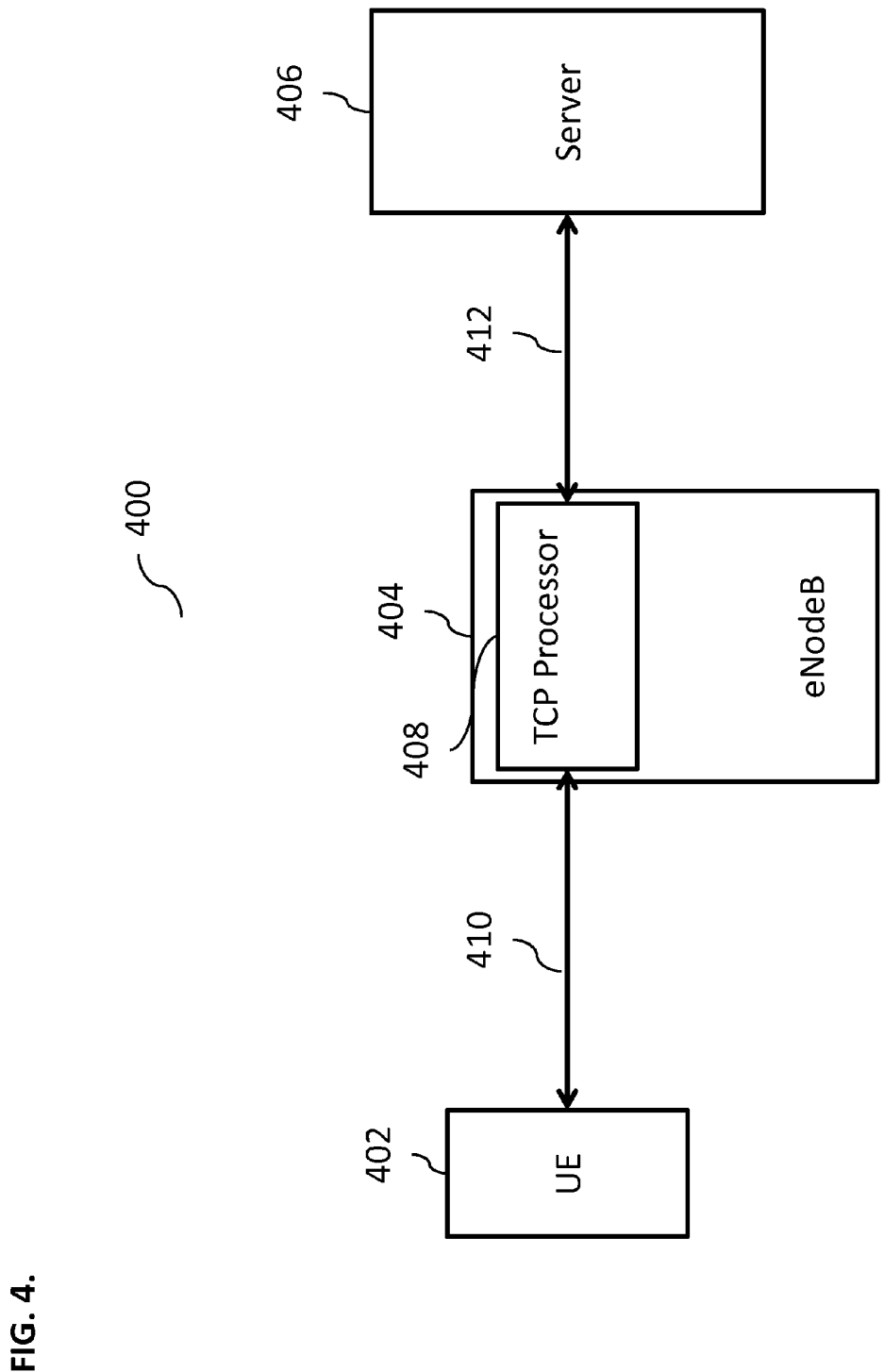
FIG. 4 illustrates an exemplary communications system that includes a transmission control protocol ("TCP") functionality in a base station, according to some implementations of the current subject matter.

FIG. 4 illustrates an exemplary system 400 having a TCP processor 408 in an eNodeB, according to some implementations of the current subject matter. The system 400 can include an eNodeB 404 and/or any other type of base station communicatively coupled with a user equipment 402 via an over-the-air link 410 and with a server 406 via link 412. The server 406 can be part of the core network (not shown in FIG. 4) and/or can be a server outside of the core network. The server can include and/or obtain data that is desired by the user equipment 402. The user equipment 402 can communicate with the eNodeB 404, as discussed above in connection with FIGS. 1a-3. The eNodeB 404 can include the structure shown in FIG. 3 and discussed above.

In some implementations, the TCP processor 408 can be a software module and/or any combination of hardware and/or software components that can be disposed in a base station (e.g., eNodeB 404). These components can be separate from other components of the base station and/or share components with other hardware and/or software disposed in the base station.

To establish connection between the user equipment 402 and the server 406, the user equipment 402 can establish connection with the TCP processor 408, which can also establish connection with the server 406. The TCP processor 408 can transmit data received from the user equipment 402 to the server 406 as well as transmit data received from the server 406 to the user equipment 402.

In TCP transmissions, throughput of a communication can be limited by two windows: a congestion window ("CNWD") and a receive window ("RW"). CNWD determines the number of bytes that can be outstanding at any time during a TCP transmission. This is different from TCP window size maintained by the receiver of data. CNWD prevents a link between two endpoints of the connection from getting overloaded with too much data traffic. The size of CNWD is calculated by estimating how much congestion there is between the two endpoints. The sender of data typically maintains CNWD. When a connection is set up, CNWD (a value maintained independently at each host) is set to a small multiple of the maximum segment size ("MSS") allowed on the connection. Further variance in the congestion window is determined by the known additive increase/multiplicative decrease ("AIMD") approach (i.e., a feedback control algorithm used in TCP congestion avoidance, which increases transmission rate (window size) until data loss occurs and/or increases CNWD by a fixed amount every round trip time. When congestion is detected, the transmitter decreases the transmission rate by a multiplicative factor (e.g., cut the congestion window in half after data loss)). If all segments are received and the acknowledgments reach the sender on time, a constant value is added to the window size. The window grows exponentially until a timeout occurs or the receiver reaches its limit (a threshold value "ssthresh"). After this, CNWD increases linearly at the rate of 1/(congestion window) packets on each new acknowledgement received. When timeout occurs, the following occurs: congestion window is reset to 1 MSS, "ssthresh" is set to half the window size before packet loss started, and "slow start" is initiated. A system administrator can adjust the maximum window size limit and/or adjust the constant added during additive increase, as part of TCP tuning. The flow of data over a TCP connection is also controlled by RW, which is provided by the receiver of data. The sender determines how much data it can send by comparing its own CNWD with RW.

To avoid congestion, CNWD should not exceed capacity of the network on which the data is transmitted. To control flow of data, RW should not exceed capacity of receiver equipment to process data. The receiver equipment can be overwhelmed by data if the receiver (e.g., a Web server) is very busy. Typically, each TCP segment can contain a current value of RW. If a sender receives an ACK, acknowledging byte 1000 and specifying RW size of 5000 bytes, the sender will not send data packets after byte 6000, even if the CNWD allows it.

Figure 5:
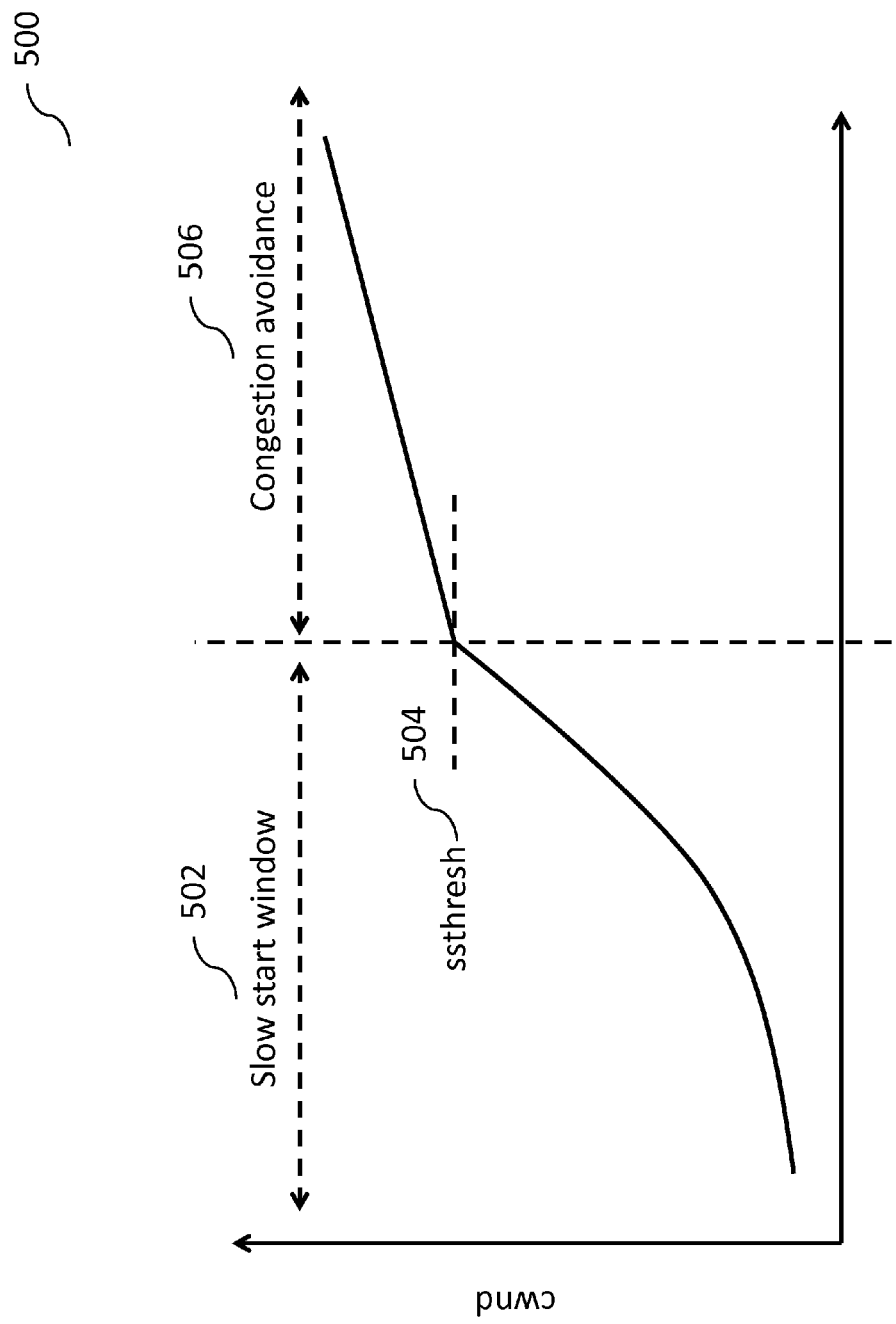
FIG. 5 illustrates an exemplary congestion window control in TCP communications.

In some implementations, the TCP processor 408 can implement control of initial window ("IW"), RW, and CNWD and/or perform other TCP-related functions to avoid congestion of a connection and thus, a loss of data packets. As shown in FIG. 5, in the slow start window 502 and prior to reaching the "ssthresh" threshold value 504, the TCP processor 408 can perform assignment of priority to data packets. Additionally, during the slow start window 602, the TCP processor 408 can perform an aggressive scheduling of data packets for transmission in the event that there exists a good radio frequency signal between the user equipment 402 and the eNodeB 404. Conversely, if a poor radio frequency is detected between the user equipment 402 and the eNodeB 404, the TCP processor 408, during the slow start window 502, can conservatively schedule data packets for transmission. This way congestion of the connection, multiple retransmissions and/or loss of data can be avoided.

Further, during the slow start window, the congestion window size can double in size with each round trip that the packet takes, i.e., each time an acknowledgement is received by the server that the packet has been successfully transmitted to and received by the endpoint device, the size of congestion window can increase (depending on the TCP implementation, the size of the congestion window can increase accordingly). Thus, the increase in size of the congestion window can be exponential. Once the congestion avoidance phase is reached, the size of the congestion window can only be increased linearly, as indicated by the straight line in congestion avoidance phase 406 in FIG. 5.

In contrast to an ideal TCP transmission lossless environment, a wireless communications environment can involve a substantial loss of packets. This can cause a server transmitting TCP packet data to constantly reset the congestion window, drop connections, etc., thereby causing substantial delay in delivery of packets, battery drainage, and other undesirable consequences. Data loss can occur as a result of various factors associated with wireless transmissions. For example, in a wireless communications environment, movement of the user equipment from one radio area having a good signal to another radio area having a poor signal can cause delay in delivery of the packets and corresponding ACKs to the server, thereby causing the server to determine that there is congestion on the line. Interference from other radio sources (e.g., other user equipment) can also cause losses. Other factors can affect packet loss as well.

Figure 6:
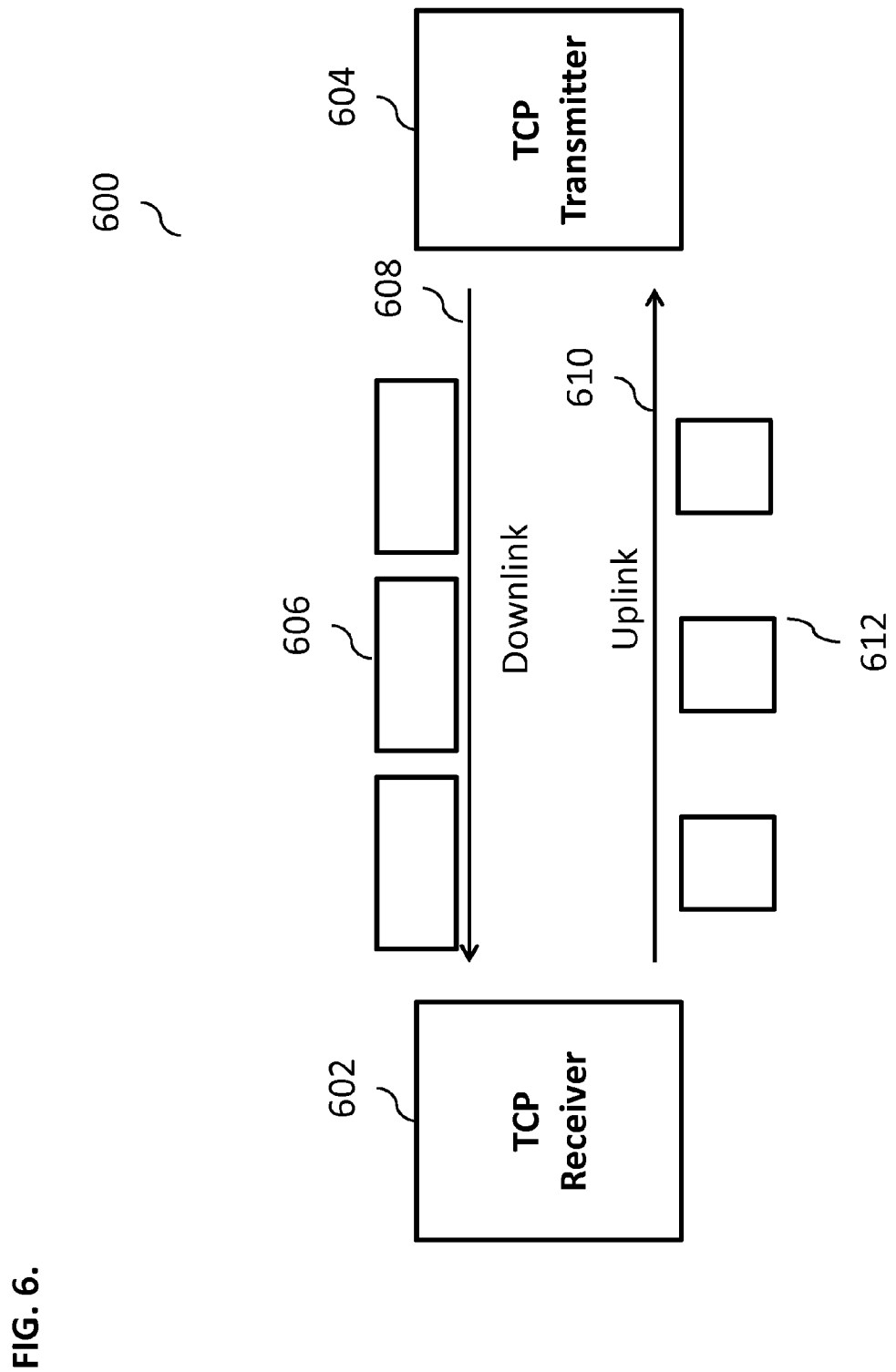
FIG. 6 illustrates an exemplary wireless communication system that can receive and/or transmit TCP signals, according to some implementations of the current subject matter.

FIG. 6 illustrates an exemplary wireless communication system 600 that can receive and/or transmit TCP signals, according to some implementations of the current subject matter. The system 600 can include a receiver 602 and a transmitter 604 that can communicate with one another on a downlink 608 to send data packets 606 and on an uplink 610 to send ACKs 612 indicating receipt of the data packets. The receiver can be a mobile device and the transmitter can be a server. The ACKs 612 can be sent using similar spacing as the data packets 606. Using the acknowledgements, the system 600 can perform estimation of a bandwidth on the link, where the spacing of the ACKs can correspond to the spacing of the data packets on the downlink.

In some implementation, long term evolution wireless communications system are capable of operating using frequency division duplex ("FDD") and/or time division duplex ("TDD") multiplexing modes. In frequency-division duplexing systems, a transmitter and a receiver can operate at different carrier frequencies. In time-division systems, outward and return signals can be separated. Further, in FDD type systems, feedback reports can be sent on uplink sub-frames for downlink transmissions sub-frames and in TDD type systems, a single uplink sub-frame can correspond to a plurality of downlink sub-frames, where the downlink sub-frames can be classified into several types corresponding to allocation of DL and UL resources, DL resources only, and sub-frames used for switching between UL and DL.

Both the LTE multiplexing modes can offer asymmetric bandwidth to the data. Low uplink bandwidth in asymmetric links can disrupt the flow of acknowledgements, which can affect performance. Further, in a multi-user wireless system, depending on user location, interference from neighboring cell, and/or any other factors, the bandwidth asymmetry can be worse than nominal values for an LTE system. The bandwidth asymmetry can be characterized by the following parameters: raw bandwidth asymmetry and normalized bandwidth asymmetry k. The raw bandwidth asymmetry can be defined as a ratio of downlink bandwidth to uplink bandwidth for a link. The normalized bandwidth asymmetry k can be defined as a ratio of transmission time for ACKs on an uplink path to transmission time for downlink packet on downlink path, i.e., a ratio of downlink link speed in packets per second to uplink speed in ACKs per second in the uplink. Links with k>1 can have a higher probability for ACK clock disruption and low throughput efficiency compared to links with k<1 because these links can have sufficient uplink bandwidth for ACKs. Despite high raw bandwidth asymmetry, the LTE links can achieve low normalized bandwidth asymmetry because of a lower size of downlink ACK packets without ACK clock disruption.

Figure 7:
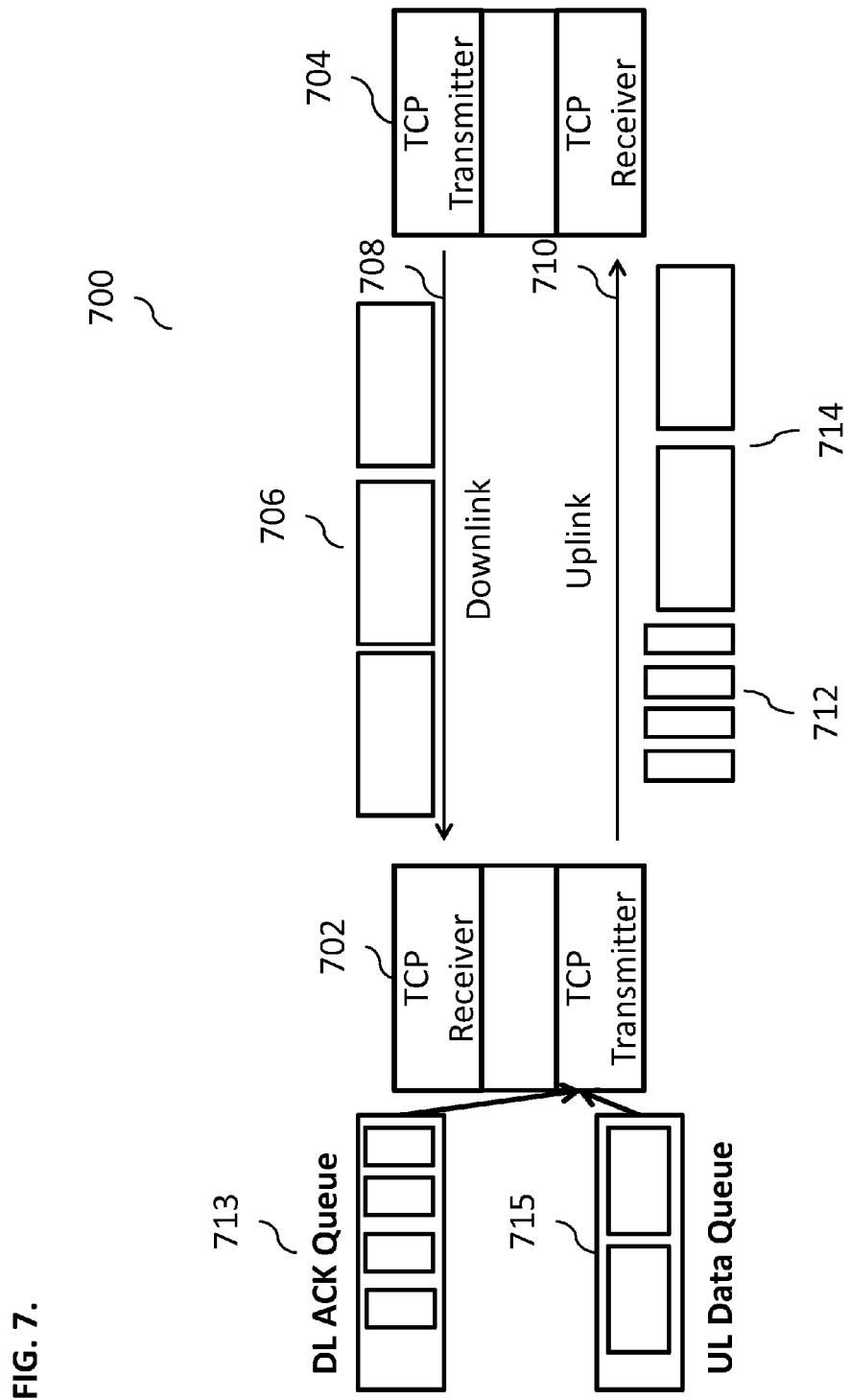
FIG. 7 illustrates an exemplary wireless communication system for transmission and/or receipt of TCP data packets, according to some implementations of the current subject matter.

However, if additional TCP connections that send traffic in the uplink direction exist, disruptions can occur. In this case, both downlink ACK and uplink data packets may have to compete for bandwidth allocation over the same narrow uplink. This can lead to ACK compression. FIG. 7 illustrates an exemplary wireless communication system 700 for transmission and/or receipt of TCP data packets, according to some implementations of the current subject matter.

The system 700 can include a TCP receiver 702 and a TCP transmitter 704 communicating with one another on a downlink 706 and an uplink 710. Downlink data packets 706 can be transmitted on the downlink 708 and their acknowledgements (ACKs) 712 can be transmitted on the uplink 710. Additionally, the uplink 714 can also transmit uplink data packets that can be sent from the receiver 702 to the transmitter 704. The receiver 702 can include a downlink ACK queue 713 that can include a plurality of ACKs that are to be transmitted to the transmitter 704 to acknowledge receipt of the downlink packets sent by the transmitter 704. The receiver 702 can also include an uplink data queue 715 that can include data packets to be transmitted on the uplink to the transmitter 704 by the receiver 702. The ACKs 712 and the uplink data packets 714 compete for bandwidth on the uplink 710, which can cause a delay in arrival of the ACKs to the transmitter 704. Further, the ACK packets can have fewer scheduling opportunities as compared to the uplink data packets. Scheduling of transmission of downlink ACKs can depend on a size of an uplink data packet and ACK rate (in pps) of the uplink. This can cause a delay in arrival of the downlink ACK packets at the transmitter 704 and thus, can increase a round trip time ("RTT") for downlink data packets. This can cause poor efficiency of the downlink, decreased throughput, congestion, duplication of transmission of the downlink packets, as well as other issues that can slow down performance of the network 700.

In some implementations, the current subject matter system can determine occurrence of downlink deterioration and apply appropriate correction techniques to the uplink flow to improve performance of the network. In some implementations, the eNodeB 404 (shown in FIG. 4) can perform such detection and/or correction using its layer 2 functionalities.

Figure 8:
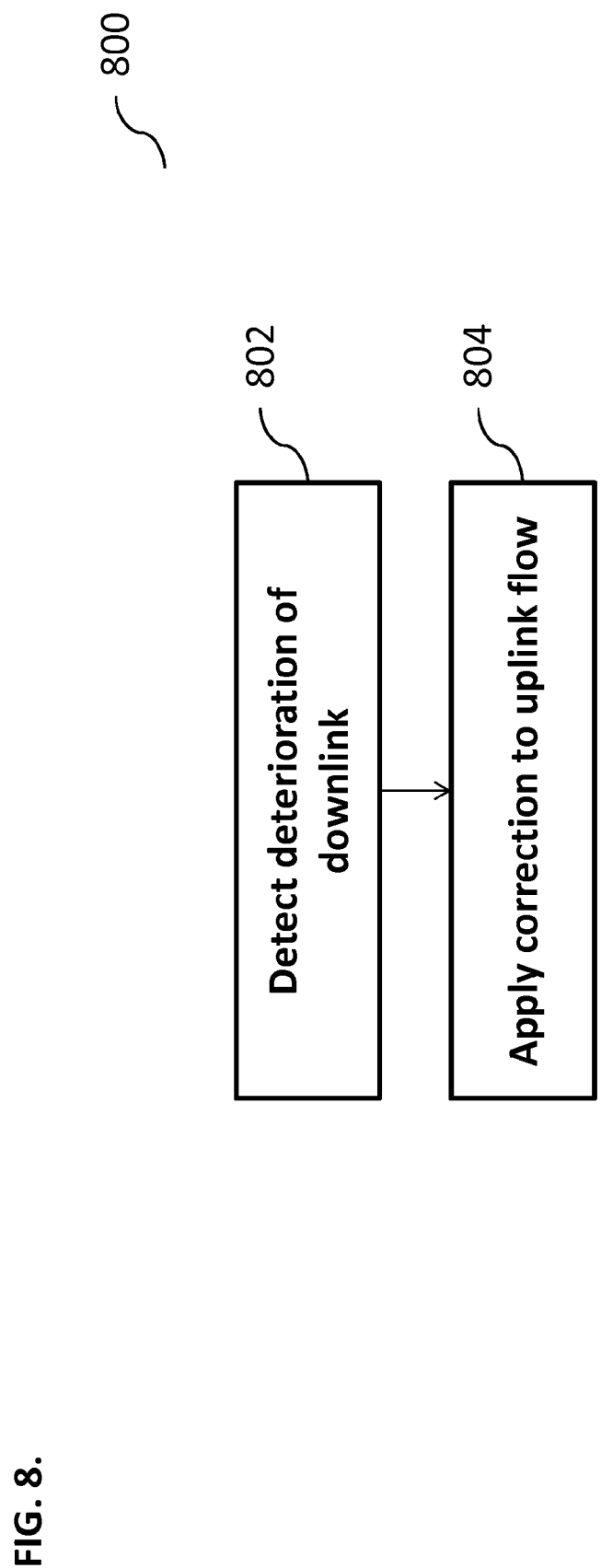
FIG. 8 illustrates an exemplary process for performing optimization of a downlink throughput, according to some implementations of the current subject matter.

FIG. 8 illustrates an exemplary process 800 for performing optimization of a downlink throughput, according to some implementations of the current subject matter. At 802, deteriorating conditions on a downlink can be detected. Upon detecting deterioration of the downlink, an uplink flow treatment can be applied by the eNodeB, at 804. The above operations are discussed in further detail below.

In some implementations, detection of a deterioration of conditions on the downlink, at 802, can be performed based on a continuous measurement of the downlink TCP flows. To perform these measurements, a layer 2 smooth air-interface round trip time ("L2 SARTT") parameter can be determined based on L2 ACKs at eNodeB and which can provide a true target value for TCP round trip time, as it is not biased by queuing issues at the TCP client. The Smoothed ARTT is based on a smoothing factor (typically between 0.8 and 0.9) that can be applied to RTT.

Figure 9:
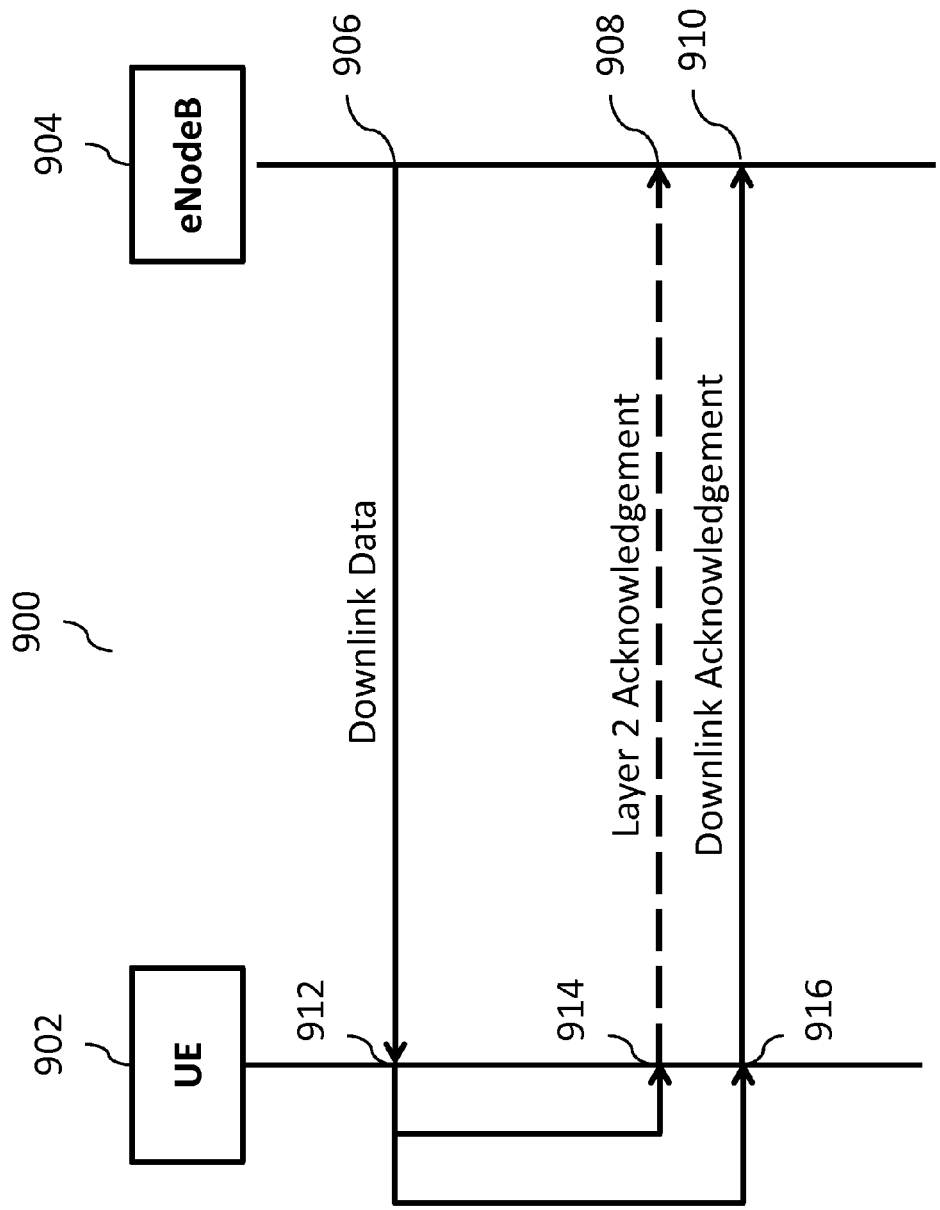
FIG. 9 illustrates an exemplary determination of a round-trip time (i.e., a round trip time between eNodeB and user equipment) at different layers, according to some implementations of the current subject matter.

FIG. 9 illustrates an exemplary determination 900 of a round-trip time at different layers, according to some implementations of the current subject matter. To determine the layer 2 smoothed air-interface round trip time value, an eNodeB 904 can send downlink data packets to user equipment 902 using a TCP layer protocol. As shown in FIG. 9, the eNodeB 904 can send downlink data packets to the user equipment 902 at time 906, which the user equipment 902 can receive at time 912. The user equipment 902 can generate a layer 2 acknowledgement using RLC layer protocol and transmit it to the eNodeB 904. This acknowledgement can be generated at time 914, based on a time that it takes to perform layer 2 processing as well as various scheduling delays that can occur at the user equipment 902 and eNodeB 904, respectively. The acknowledgement can arrive at the eNodeB 904 at time 908. The difference between time 906 and time 908 can represent a true air-interface round trip time as measured at layer 2 at eNodeB 904. As shown in FIG. 9, the user equipment 902 can also be affected by various TCP layer queuing delays, which can cause the user equipment 902 to send a downlink acknowledgement on the TCP layer at time 916. In some cases, where only downlink data traffic exists towards user equipment 902 such that there is no data traffic in the uplink, the TCP queuing delays can be negligible. However, when there exists a simultaneous downlink/uplink flow, the TCP queuing delays can be large. The acknowledgement can be received at time 910 at the eNodeB 904. The difference between time 906 and time 910 can represent an air interface round trip time as measured at the TCP layer. The difference between time 908 and time 910 can represent a round trip time bias due to ACK queuing that can occur at the user equipment 902. In that regard, when simultaneous uplink/downlink flows exist, the difference between time 906 and 910 can be also referred to as a biased air interface round trip time ("BARTT"), as measured at the TCP layer.

Figure 10:
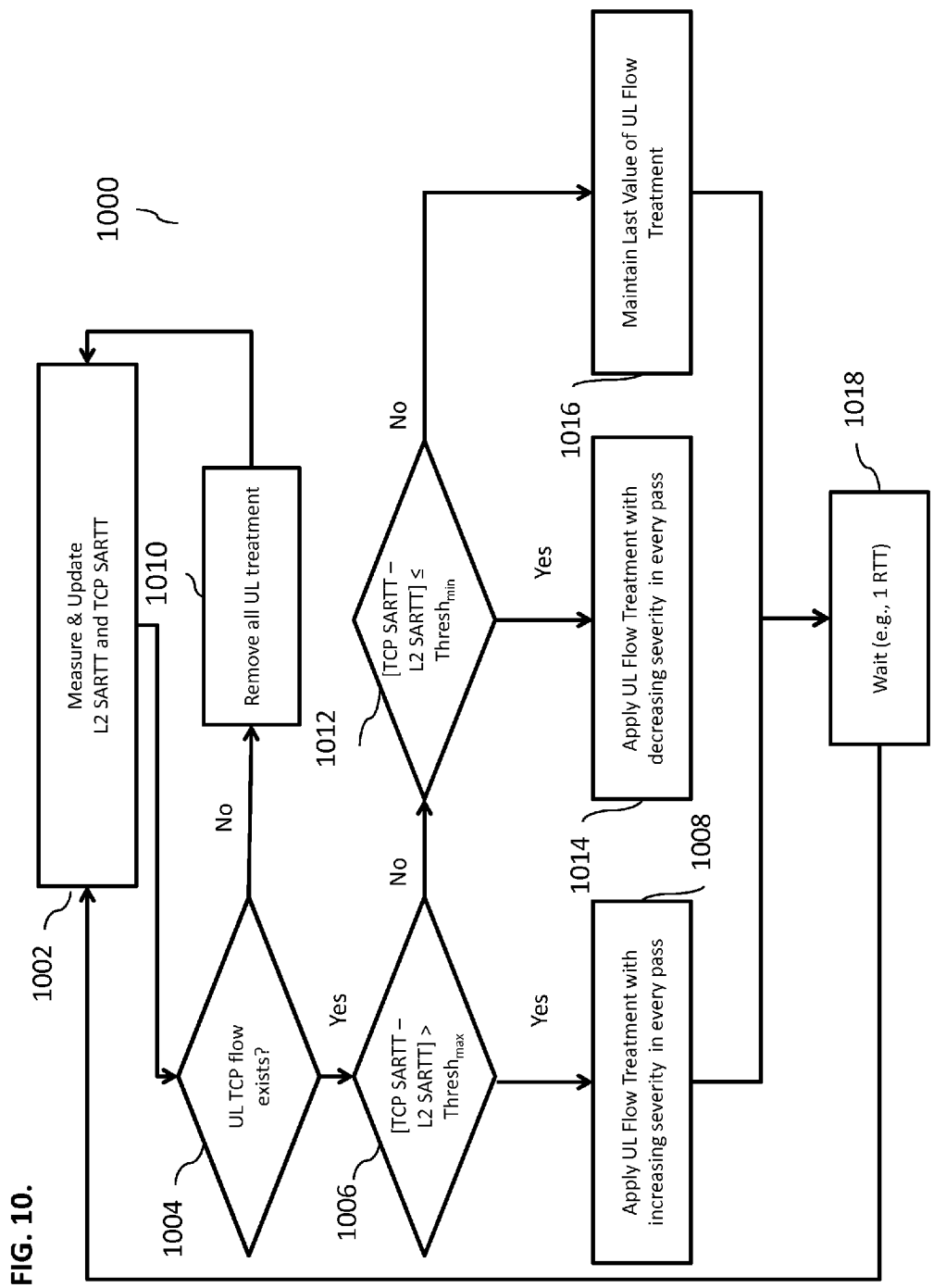
FIG. 10 illustrates an exemplary process for performing an uplink flow treatment, according to some implementations of the current subject matter.

FIG. 10 illustrates an exemplary process 1000 for the treatment of uplink flows, according to some implementations of the current subject matter. The process 1000 can be performed for all downlink TCP flows. A TCP downlink smoothed air-interface round trip time ("TCP DL SARTT") can be maintained at the eNodeB 904 for downlink flows to the user equipment 902 (as shown in FIG. 9).

Referring to FIG. 10, at 1002, the eNodeB 904 (as shown in FIG. 9) can continuously measure and update values for L2 SARTT and TCP SARTT for downlink TCP flows of the user equipment 902, based on the layer 2 acknowledgements (e.g., HARQ, RLC, PDCP PDU delivery status reports, etc.) and downlink TCP acknowledgements, respectively. The acknowledgements can be received from the user equipment 902 (shown in FIG. 9). At 1004, the eNodeB 904 (shown in FIG. 9) can determine whether or not any uplink TCP flows exist. If not, all uplink flow treatment can be removed, at 1010, and the processing can return to 1002 for measuring and updating L2 SARTT and TCP SARTT values.

Otherwise, the processing proceeds to 1006. At 1006, a difference between values [TCP SARTT−L2 SARTT] can be determined. The difference between these values can provide an indication as to the bias (if any) of the air-interface RTT ("ARTT") due to TCP layer issues. The difference between TCP SARTT and L2 SARTT can be then be compared to threshold values, $Thresh_{min}$ and $Thresh_{max}$.

Figure 11A:
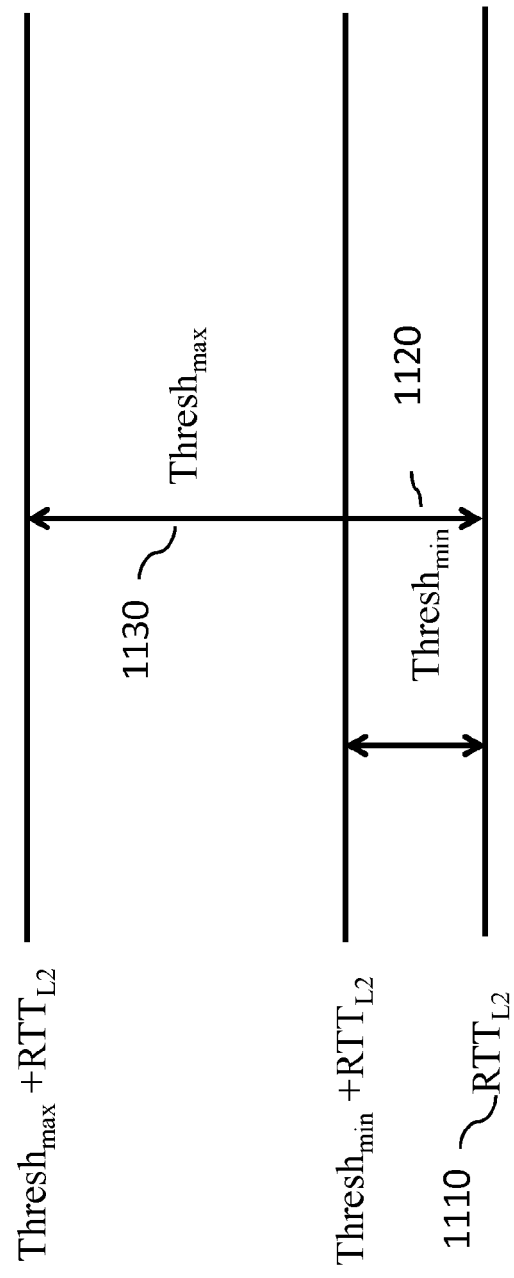
FIG. 11a illustrates an exemplary maximum and minimum threshold values for round trip time, according to some implementations of the current subject matter.

As shown in FIG. 11a, $Thresh_{min}$ threshold value 1120 can represent an acceptable dwell time of TCP packets and TCP ACKs in the TCP layer when there is no TCP ACK congestion in the uplink. $Thresh_{min}$ value can be determined using measurements in a controlled environment, such as, a vendor laboratory. $Thresh_{max}$ threshold value 1130 can represent a maximum acceptable bias in the TCP RTT due to TCP ACK buffering and can be indirectly related to the maximum acceptable downlink throughput degradation due to TCP ACK buffering before corrective measures in the uplink can be triggered. $Thresh_{max}$ value can depend on a target acceptable value for downlink throughput degradation due to TCP ACK buffering in accordance with the following. Assuming that x is an acceptable downlink throughput degradation percentage, e.g. if x=5, then there exists a 5% degradation in the downlink throughput that is acceptable; $C_1$ is a TCP throughput at $Thresh_{max}$ value; $C_2$ is a TCP throughput at $Thresh_{min}$ value; $RTT_{L2}$ is a round trip time as measured at layer L2; and CWND is a TCP congestion window. Then, $C_1=(1-x)*C_2$; $C_1=CWND/[Thresh_{max}+RTT_{L2}]$; and $C_2=CWND/[Thresh_{min}+RTT_{L2}]$. Upon combination of these equations, the following results $$\frac{CWND}{[Thresh_{max} + RTT_{L2}]} = (1-x) * \frac{CWND}{[Thresh_{min} + RTT_{L2}]} \quad (1)$$

Thus, $$Thresh_{max} = \frac{[Thresh_{min} + RTT_{L2}]}{(1-x)} + RTT_{L2} \quad (2)$$

In some implementations, $Thresh_{min}$ and $RTT_{L2}$ values can be determined using various measurements and the x value can be determined based on downlink throughput variance objectives. High values of x can lead to higher variations of downlink throughput as compared to lower values of x.

Referring back to FIG. 10, at 1006, if the difference of TCP SARTT and L2 SARTT is greater than $Thresh_{max}$, the processing proceeds to 1008, where application of uplink flow treatment can be performed with increasing severity in every pass to reduce congestion and so as to bring down the TCP SARTT. Thereafter, the processing proceeds to the 1018, where a wait time is implemented (e.g., a 1 RTT). After the wait time period is completed, at 1018, the processing returns to 1002.

Alternatively, at 1006, if the difference of TCP SARTT and L2 SARTT is less than $Thresh_{max}$, the processing can proceed to 1012, where [TCP SARTT−L2 SARTT] value is compared to $Thresh_{min}$. If it less than or equal to $Thresh_{min}$, the processing proceeds to 1014, where severity of installed uplink flow treatment can be decreased in every pass from its last value. After a wait time period, at 1018, the processing returns to 1002.

Alternatively, at 1012, if difference of TCP SARTT and L2 SARTT is greater than $Thresh_{min}$, the last value of flow treatment can be maintained, at 1016. After the wait time period, at 1018, the processing returns to 1002. This process can continue until all uplink and/or downlink flows are terminated.

Figure 11B:
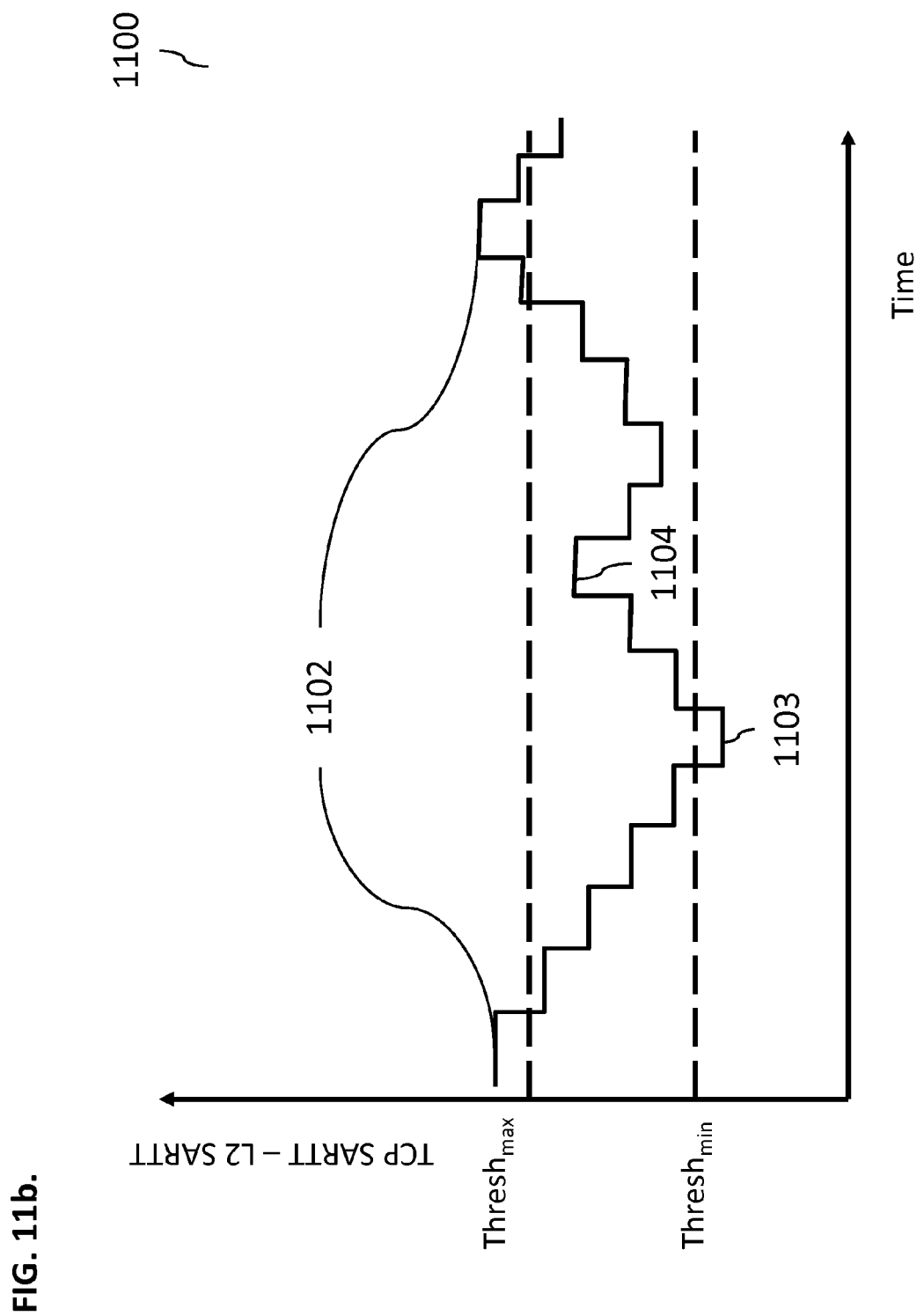
FIG. 11b illustrates an exemplary plot showing changes in delta air interface round trip time ("ARTT") as uplink flow treatment is applied, as illustrated in FIG. 10, according to some implementations of the current subject matter.

FIG. 11b illustrates an exemplary plot 1100 showing application of different level of treatment severity to uplink, according to some implementations of the current subject matter. The treatment can be applied to uplink flows at 1102, while decreased severity treatment can be applied to uplink flows at 1103 and at 1104. If the difference value of [TCP SARTT−L2 SARTT] is between maximum and minimum values of thresholds, the last severity level of uplink flow treatment can be maintained.

Referring back to FIG. 8, once the deterioration of the downlink has been detected by the eNodeB, at 802, the process 800 can proceed to apply various uplink flow treatment techniques to improve performance of the system, at 804. The current subject matter system can slow down the uplink data flows, which can free up enough uplink bandwidth for transmission of Downlink TCP acknowledgements. In some implementations, the treatment techniques can include, but are not limited to, at least one of the following: delaying uplink ACK packets, selectively dropping uplink data packets, constraining advertised receive window for uplink data flows, setting ECN bit for uplink traffic, and performing local ACK construction at the eNodeB. In some implementations, one or more of these techniques can be applied to uplink TCP flows for the purposes of freeing up resource on the uplink for sending downlink ACKs. Each of these techniques is discussed below in connection with FIGS. 12-16b.

A. Delay Uplink ACK Packets

Figure 12:
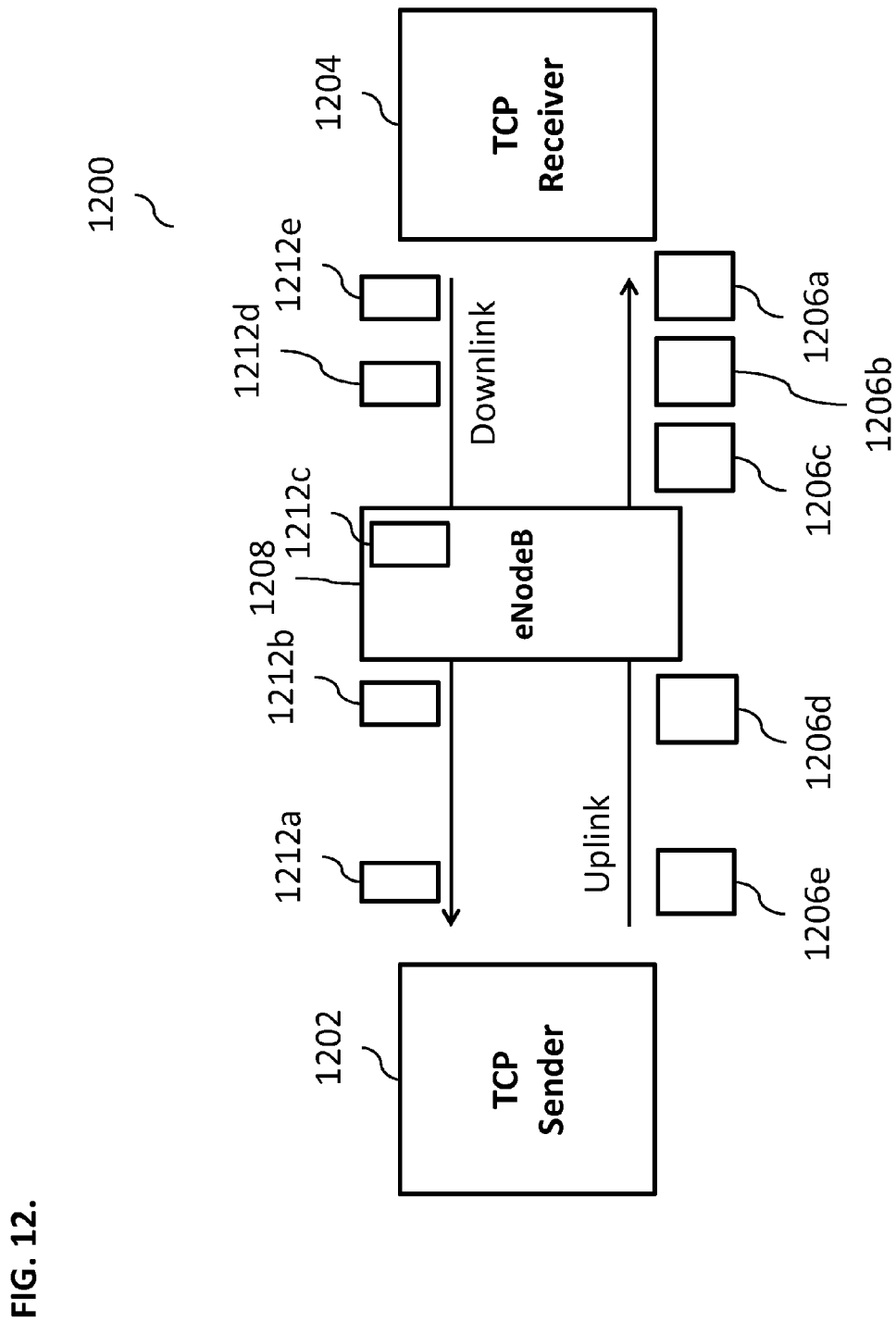
FIG. 12 illustrates an exemplary process for delaying sending of uplink ACK packets, according to some implementations of the current subject matter.

FIG. 12 illustrates an exemplary process 1200 for delaying sending of uplink ACK packets, according to some implementations of the current subject matter. As shown in FIG. 12, a TCP sender 1202 in the uplink (e.g., user equipment) can be communicatively coupled to an eNodeB 1208 (and/or any other type of base station), which in turn, can be communicatively coupled to a TCP receiver 1204. Uplink data packets 1206 (*a, b, c, d, e*) can be sent from the TCP sender 1202 through the eNodeB 1208 to the TCP receiver 1204. In the downlink, TCP ACK packets 1212 (*a, b, c, d, e*) for receipt of the uplink data (i.e., uplink ACK packets) can be sent from the TCP receiver 1204 through the eNodeB 1208 to the TCP sender 1202.

In some implementations, the uplink ACK packets 1212*c*, 1212*d*, and 1212*e* can be transmitted by the TCP receiver 1204 to the eNodeB 1208 based on a normal ACK spacing. When the packets arrive at the eNodeB 1208, the eNodeB can apply treatment (based on the determination discussed above) to increase spacing between the uplink ACK packets that leave the eNodeB 1208 for delivery to the TCP sender 1202. Thus, the packets 1212*a* and 1212*b* that are output by the eNodeB 1208 can have a greater spacing than the uplink ACK packets 1212*c*, 1212*d*, and 1212*e*.

Based on the spacing between uplink ACK packets 1212*a* and 1212*b*, the TCP sender 1202 can now only generate and transmit uplink data packets 1206*d* and 1206*e* at the same spacing as packets 1212*a* and 1212*b* creating bandwidth for transmission of downlink ACKs. In some implementations, by buffering uplink acknowledgement packets for one round trip time at the eNodeB 1208 can reduce uplink sending rate by as much as 50%.

In some implementations, the eNodeB 1208 can include a packet scheduling processor (not shown in FIG. 12) that can apply delay and/or buffer uplink ACK packets. The delay can be applied to selected uplink TCP flows of the TCP sender 1202, in accordance with the process 1000 shown in FIG. 10, such that RTT bias due to downlink ACK buffering can be maintained within $Thresh_{max}$ and $Thresh_{min}$. The uplink ACK packets can be delayed increasingly, as long as the difference [TCP SARTT−L2 SARTT] is greater than $Thresh_{max}$. The uplink packets can be delayed by decreasing value as long as [TCP SARTT−L2 SARTT] is less than or equal to $Thresh_{min}$. The uplink ACK delay can be maintained at the last value, if the difference is between $Thresh_{max}$ and $Thresh_{min}$.

As stated above, because, TCP data packets are transmitted based on an arrival rate of ACKs, by slowing down the uplink ACKs at the eNodeB 1208, transmission of uplink data packets can be slowed from the user equipment thereby reducing the uplink bandwidth consumed by uplink data flows. This can eventually free up the bandwidth for downlink ACK packets. The following equation can be used to determine an impact of the round trip time on TCP throughput using the technique illustrated in FIG. 12:

$$TCP\ Throughput \leq \frac{MSS}{RTT} * \frac{1}{\sqrt{p}} \quad (3)$$

where MSS is a maximum segment size in bits, RTT is round trip time in milliseconds and p is a packet drop probability.

Using the above equation (3), it can be determined that the throughput can decrease linearly as the RTT increases. In some implementations, the above technique is more advantageous when uplink TCP flows have a lower round trip time as opposed to higher round trip time.

B. Selective Dropping Of Uplink Data Packets

Figure 13:
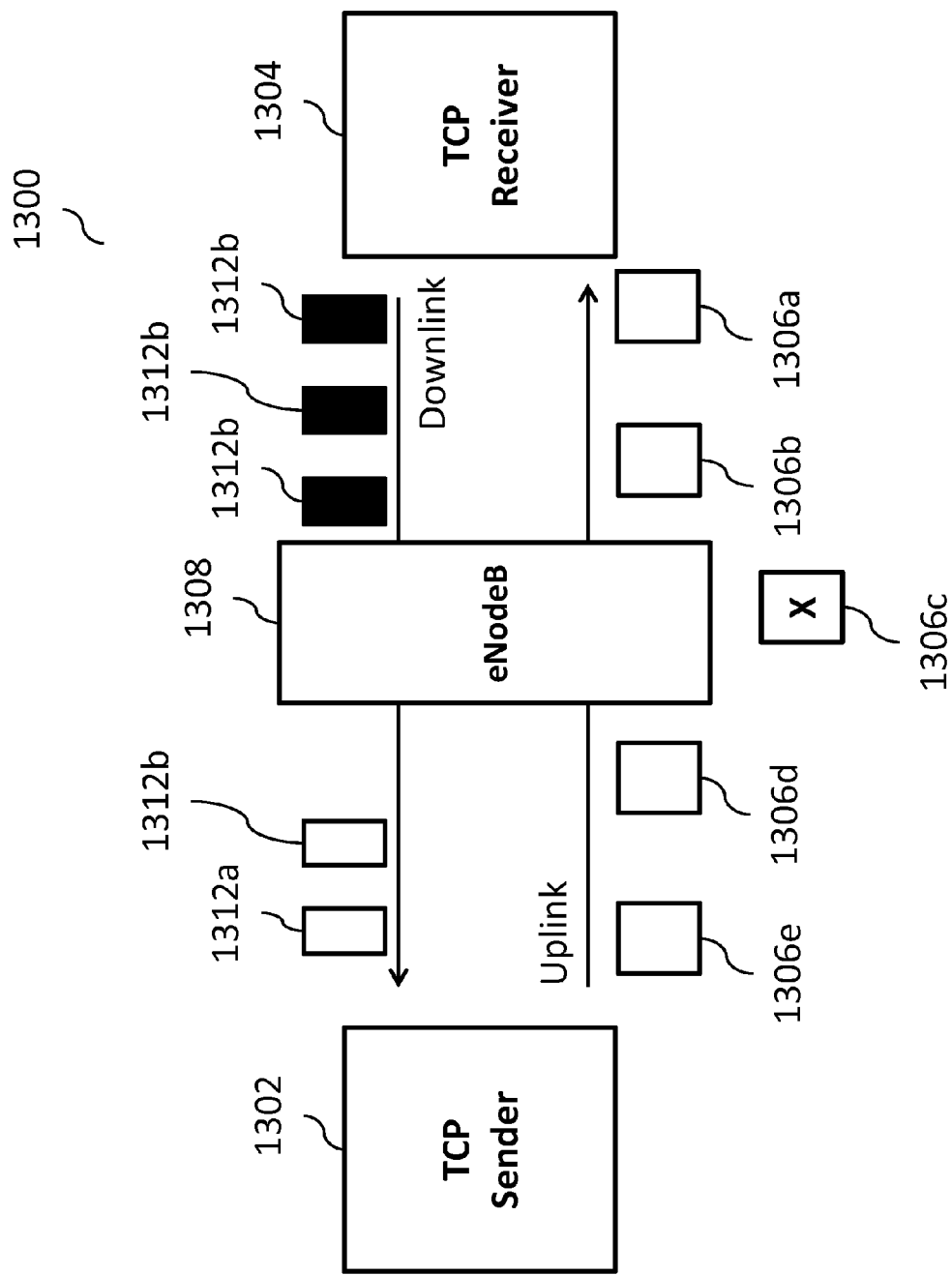
FIG. 13 illustrates an exemplary process that can perform selective dropping of a data packet, according to some implementations of the current subject matter.

FIG. 13 illustrates an exemplary process 1300 that can perform selecting dropping of a data packet, according to some implementations of the current subject matter. As shown in FIG. 13 (which is similar to FIG. 12), a TCP sender 1302 in uplink (e.g., user equipment) can be communicatively coupled to an eNodeB 1308 (and/or any other type of base station), which in turn can be communicatively coupled to a TCP receiver 1304. Uplink TCP data packets 1306 (*a, b, c, d, e*) can be sent from the TCP sender 1302 through the eNodeB 1308 to the TCP receiver 1304. Uplink ACK packets 1312 (*a, b, . . .* ) can be sent from the TCP receiver 1304 through the eNodeB 1308 to the TCP sender 1302. As shown in FIG. 13, uplink data packet 1306*c* can be selected by the eNodeB 1308 to be dropped from the uplink TCP flow.

Dropping of uplink packets from uplink TCP flow can cause the TCP receiver 1304 to send duplicate ACKs ("DUP ACKs") 1312*b* multiple times until the missing segment is received. Upon receipt of three DUP ACKs, the uplink TCP sender 1302 can halve its congestion window thereby slowing down the uplink TCP transmissions and freeing up bandwidth for downlink ACK packets.

In some implementations, the current subject matter system shown in FIG. 13 can perform selective packet dropping based on a measurement of downlink TCP SARTT and L2 SARTT, calculation of a difference between two values (as described above), and comparing it to $Thresh_{min}$ and $Thresh_{max}$, in accordance with the process 1000 shown in FIG. 10. The uplink packets can be dropped at an increasing rate as long as [TCP SARTT−L2 SARTT] is greater than $Thresh_{max}$. The uplink packets can be dropped at a decreasing rate as long [TCP SARTT−L2 SARTT] is less than or equal to $Thresh_{min}$. The packet drop rate can be maintained at its last value if [TCP SARTT−L2 SARTT] is between $Thresh_{max}$ and $Thresh_{min}$.

C. Constraining Advertised Receive Window for Uplink Data Flows

Figure 14A:
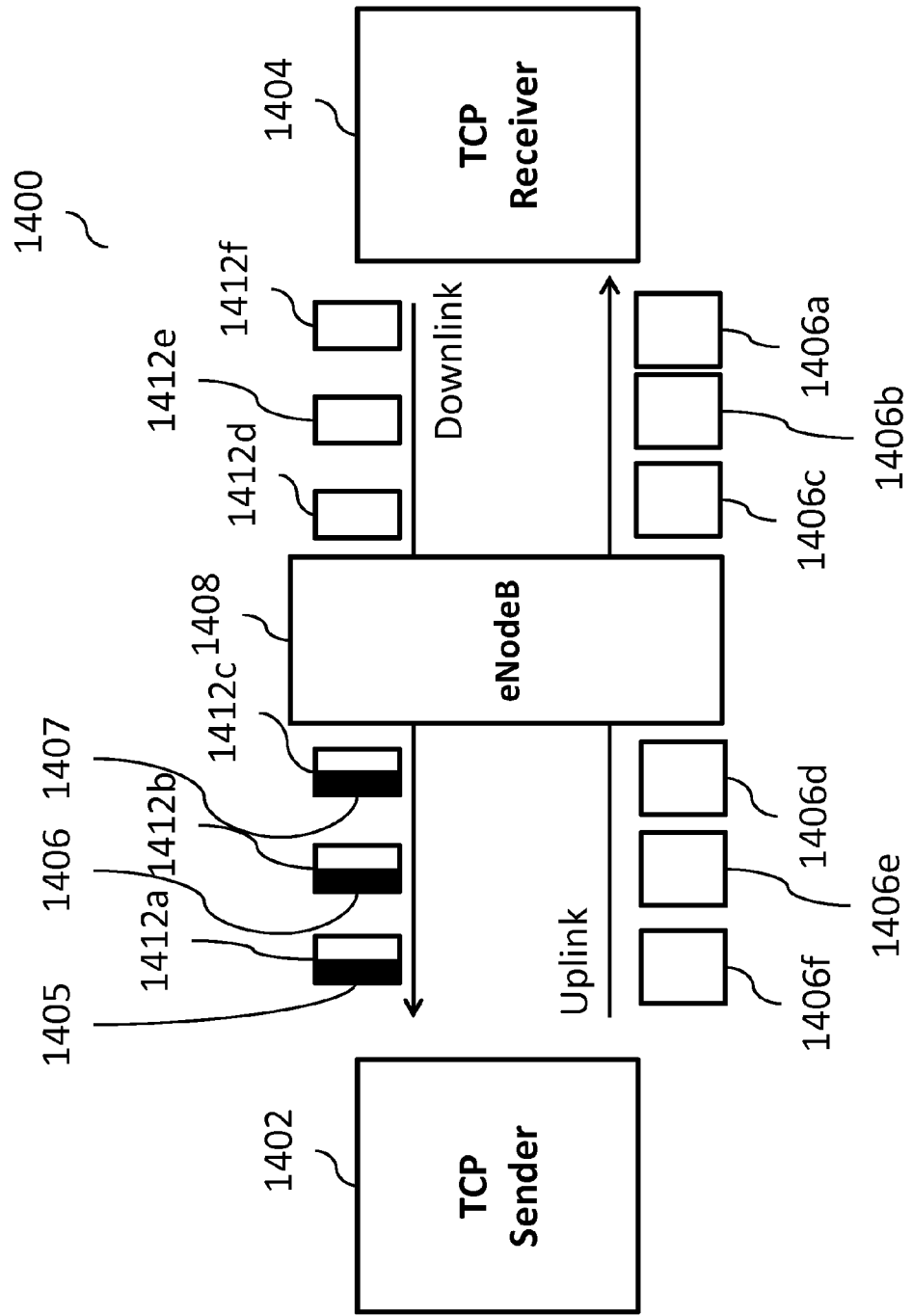
FIG. 14a illustrates an exemplary process that can perform constraining advertised receive window for uplink data flows, according to some implementations of the current subject matter.

FIG. 14*a* illustrates an exemplary process 1400 that can perform constraining advertised receive window for uplink data flows, according to some implementations of the current subject matter. As shown in FIG. 14*a* (which is similar to FIG. 13), a TCP sender 1402 in uplink (e.g., user equipment) can be communicatively coupled to an eNodeB 1408 (and/or any other type of base station), which in turn can be communicatively coupled to a TCP receiver 1404. Uplink data packets 1406 (*a, b, c, d, e, f*) can be sent from the TCP sender 1402 in uplink (e.g., user equipment) through the eNodeB 1408 to the TCP receiver 1404. Uplink ACK packets 1412 (*a, b, c, d, e, f*) can be sent from the TCP receiver 1404 through the eNodeB 1408 to the TCP sender 1402. The eNodeB 1408 shown in FIG. 14 can manipulate an advertised receive window ("RWND") 1405, 1406 and 1407 (part of the packet 1412*a*, 1412*b* and 1412*c*) and replace it with a new RWND to be sent towards uplink TCP sender (TCP sender 1402), where the new RWND value can be smaller than the original RWND value. The lower RWND can be based on a determination that [TCP SARTT−L2 SARTT] is greater than maximum threshold value $Thresh_{max}$, as discussed above. A lower receive window can cause TCP uplink sender to immediately reduce its congestion window ("CWND").

Figure 14B:
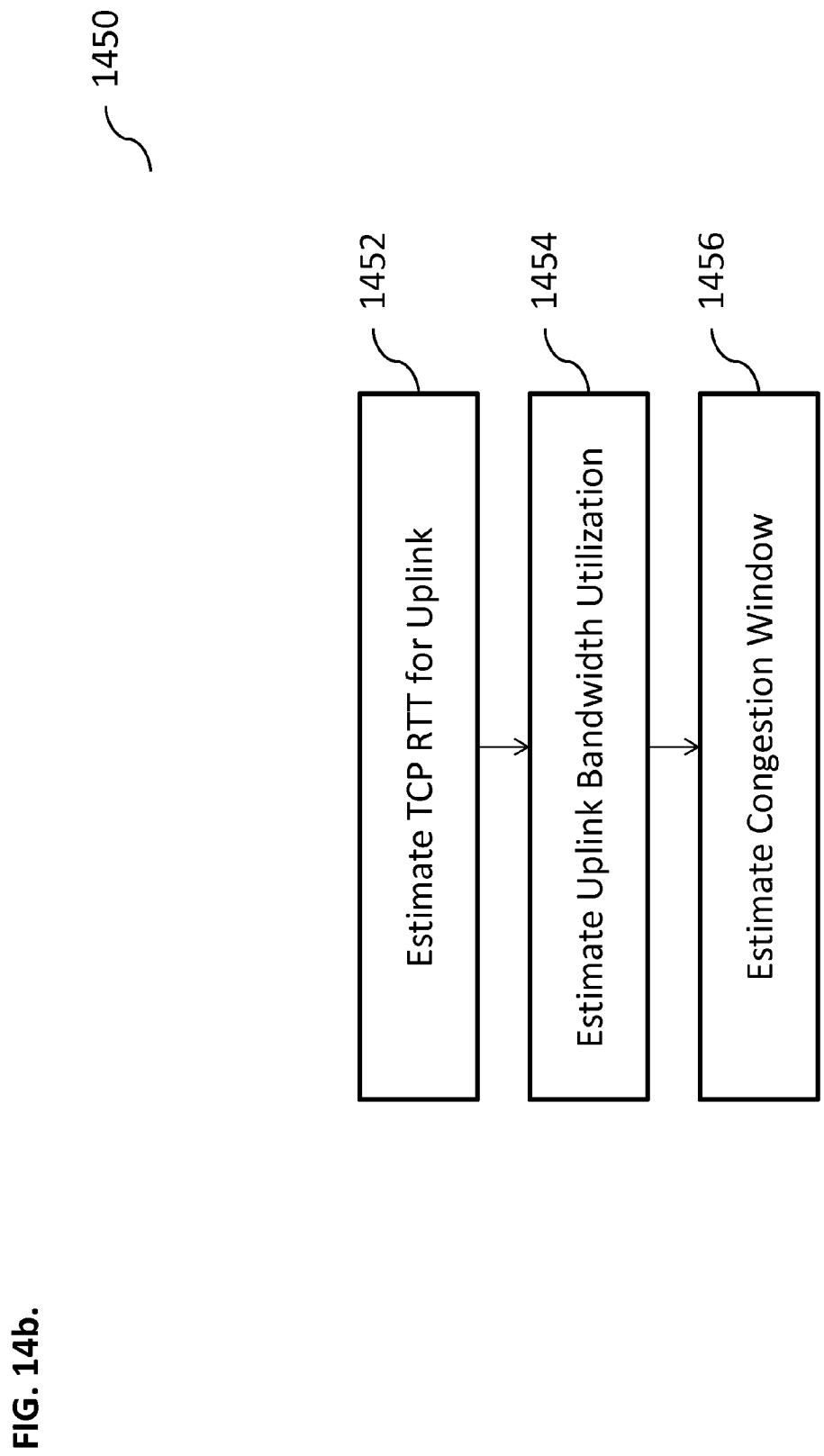
FIG. 14b illustrates an exemplary process for determining uplink congestion window by an eNodeB, according to some implementations of the current subject matter.

In some implementations, the current subject matter can perform an initial coarse estimation of an uplink congestion window that can be determined by the eNodeB 1408. FIG. 14*b* illustrates an exemplary process 1450 for determining uplink CWND by the eNodeB 1408, according to some implementations of the current subject matter. At 1452, a TCP round trip time for an uplink can be estimated based on the measured downlink layer 2 smoothed round trip time and uplink round trip time from the eNodeB to the uplink TCP Receiver ("UL RTT"). A coarse TCP RTT for the uplink can be determined using the following equation:

$$\text{Coarse TCP RTT for UL} = \text{DL L2 SARTT} + \text{UL RTT} + \text{Average Scheduling Delay for UL} \quad (4)$$

At 1454, an uplink bandwidth utilization can be estimated by counting uplink data packets transmitted within one RTT window. Then, at 1456, congestion window can be estimated based on the estimated values from 1452 and 1454, based on the following equation:

$$\text{Coarse CWND} = \text{UL Bandwidth Utilization}/\text{TCP RTT for UL} \quad (5)$$

In some implementations, the current subject matter system shown in FIG. 14a can perform adjustment of advertised receiver window for an uplink based on a measurement of downlink TCP SARTT and L2 SARTT, calculation of a difference between two values and comparison of the difference to $\text{Thresh}_{min}$ and $\text{Thresh}_{max}$, in accordance with the process 1000 shown in FIG. 10. The advertised receive window for the uplink traffic can be reduced in every pass as long as [TCP SARTT−L2 SARTT] is greater than $\text{Thresh}_{max}$. The advertised receive window for the uplink traffic can be increased in every pass as long as [TCP SARTT−L2 SARTT] is less than or equal to $\text{Thresh}_{min}$. The advertised receive window can be maintained at its last value if [TCP SARTT−L2 SARTT] is between $\text{Thresh}_{max}$ and $\text{Thresh}_{min}$.

D. Setting ECN Bit for Uplink Traffic

In some implementations, the current subject matter can implement use of an explicit congestion notification ("ECN") bit for an uplink traffic. ECN allows for end-to-end notification of network congestion without dropping packets and can be used between two ECN-enabled endpoints when the underlying network infrastructure also supports it. Use of ECN has been specified in standard RFC 3168.

Figure 15A:
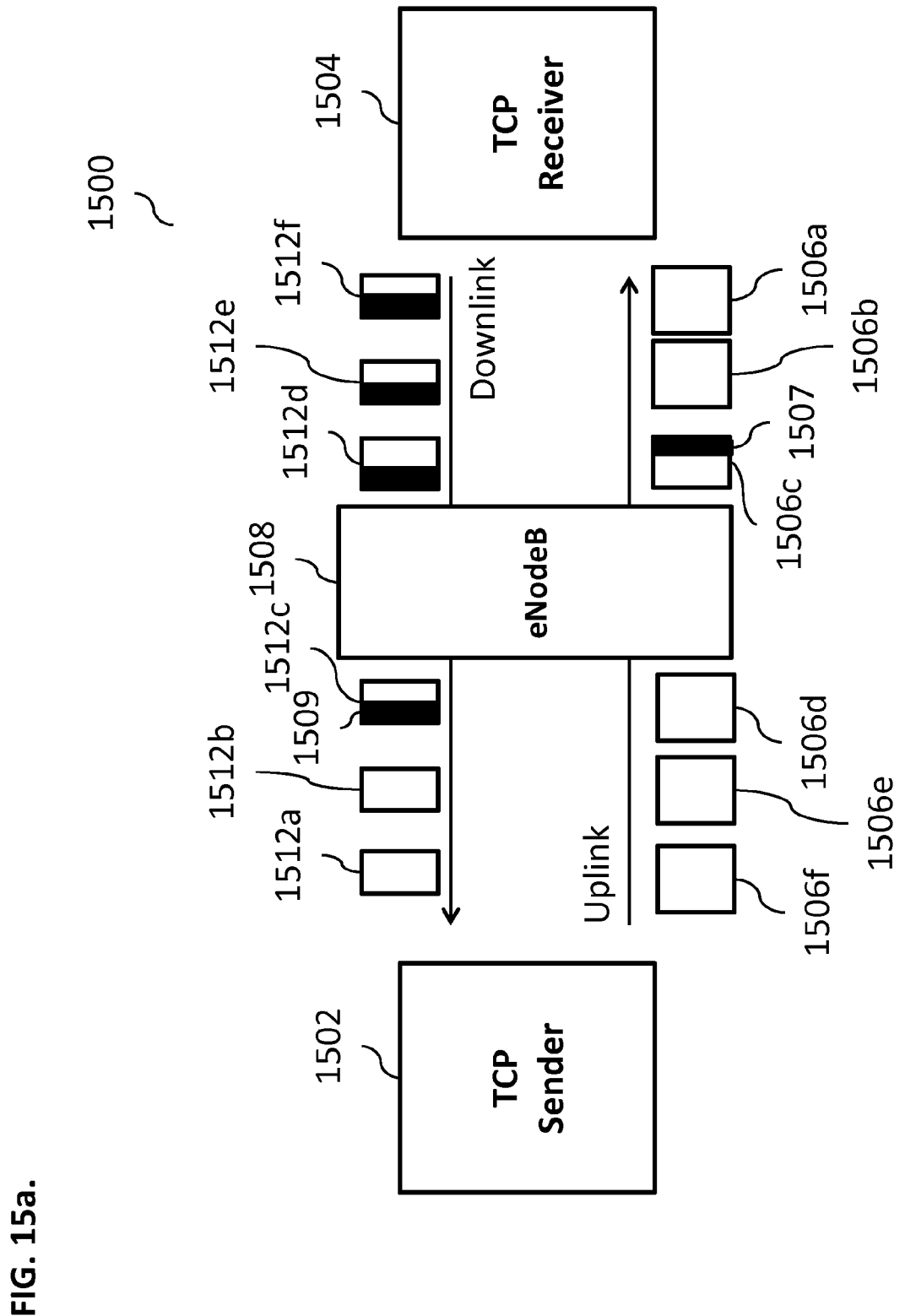
FIG. 15a illustrates an exemplary process that can perform setting of an explicit congestion notification bit for uplink data flows, according to some implementations of the current subject matter.
Figure 15B:
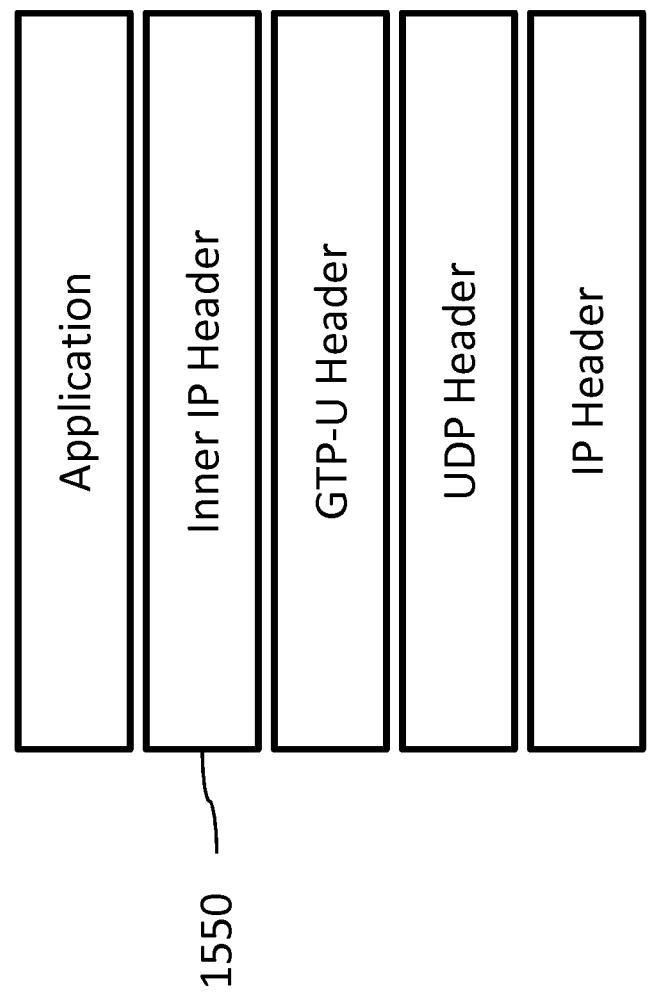
FIG. 15b illustrates an exemplary inner IP header, according to some implementations of the current subject matter.

FIG. 15a illustrates an exemplary process 1500 that can perform setting of an ECN bit for uplink data flows, according to some implementations of the current subject matter. As shown in FIG. 15a (which is similar to FIG. 14a), a TCP sender 1502 in uplink (e.g., user equipment) can be communicatively coupled to an eNodeB 1508 (and/or any other type of base station), which in turn can be communicatively coupled to a TCP receiver 1504. Uplink data packets 1506 (a, b, c, d, e, f) can be sent from the TCP sender 1502 through the eNodeB 1508 to the TCP receiver 1504. Uplink ACK packets 1512 (a, b, c, d, e, f) can be sent from the TCP receiver 1504 through the eNodeB 1508 to the TCP sender 1502. In some implementations, eNodeB 1508 upon sensing uplink congestion can set congestion experienced ("CE") bit 1507 in the inner IP header (e.g., inner IP header 1550, as shown in FIG. 15b) of the uplink data packets (e.g., packet 1506c). Upon receiving the uplink packet 1506c with CE bit set, an ECN capable TCP receiver (e.g., TCP receiver 1504) can mark a TCP ECN echo ("ECE") bit 1509 in the uplink ACK packets sent towards source (e.g., packet 1512c, d, e, f). TCP sender 1502 upon receiving a TCP packet with ECE bit marked, can reduce its CWND and send congestion window reduced ("CWR") marked packet (e.g. 1506f). TCP receiver can stop marking ECE bit once it receives packet 1506f. In some implementations, by setting the ECN bit 1507 in an uplink data packet, congestion control can be achieved without dropping of packets, which can lead to higher bandwidth efficiency as no re-transmissions take place. In some implementations, the eNodeB 1508 can monitor for TCP SYN, ACK message for each uplink TCP connection setup to determine whether ECN bit setting is supported by the endpoints in a wireless network. If endpoints support ECN bit setting, then the eNodeB 1508 can apply the above technique to reduce congestion on the downlink.

In some implementations, the eNodeB 1508 can mark the CE bit in the inner IP header based on a measurement of downlink TCP SARTT and L2 SARTT, calculation of a difference between two values and comparison of it to $\text{Thresh}_{min}$ and $\text{Thresh}_{max}$, in accordance with the process 1000 shown in FIG. 10. The marking of CE bit can continue as long as [TCP SARTT−L2 SARTT] is greater than $\text{Thresh}_{max}$. Marking of the CE bit in the inner IP header can be stopped if [TCP SARTT−L2 SARTT] is less than $\text{Thresh}_{max}$.

E. Local ACK Generation at eNodeB

Figure 16A:
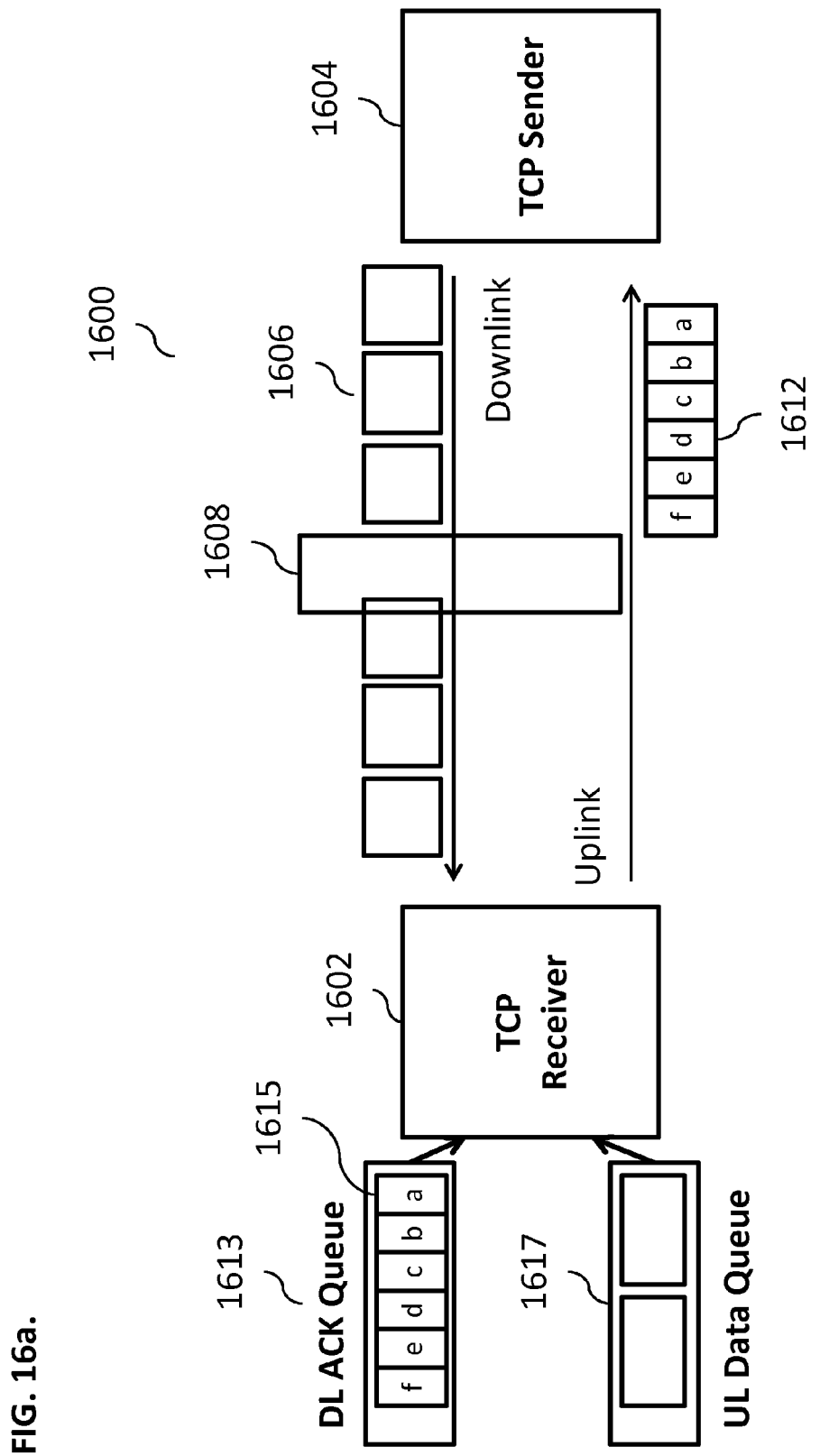
FIG. 16a illustrates an exemplary process that can perform generation of downlink acknowledgement locally and dropping of delayed acknowledgements received from a user equipment, according to some implementations of the current subject matter.

FIG. 16a illustrates an exemplary process 1600 that can perform generation of downlink acknowledgement locally and dropping of delayed acknowledgements received from a user equipment, according to some implementations of the current subject matter. As shown in FIG. 16a, a TCP receiver 1602 (e.g., a user equipment) can be communicatively coupled to an eNodeB 1608 (and/or any other type of base station), which in turn can be communicatively coupled to a TCP transmitter 1604 (e.g., a server). Downlink data packets 1606 can be sent from the TCP transmitter 1604 through the eNodeB 1608 to the TCP receiver 1602. Downlink ACK packets 1615 (a, b, c, d, e, f) can be sent from the TCP receiver's queue 1613 through the eNodeB 1608 to the TCP transmitter 1604. The ACK packets 1615 can be buffered in the queue 1613 of the TCP receiver 1602. The ACK packets 1615 in the queue 1613 compete for bandwidth with data packets in the uplink data queue 1617. In some implementations, to indicate receipt of a packet by the TCP receiver 1602, the eNodeB 1608 can generate an ACK data packet 1612 based on layer 2 ACK determined within the eNodeB 1608. The ACK packets 1612 corresponds to the data packets received by the TCP receiver 1602 and correspond to the downlink ACK packets 1615 in the queue 1613. The ACK packets 1612 can be transmitted by the eNodeB 1608 to the TCP transmitter 1614 on the uplink to inform the TCP transmitter 1604 that the packets have been received at the TCP receiver 1602.

Figure 16B:
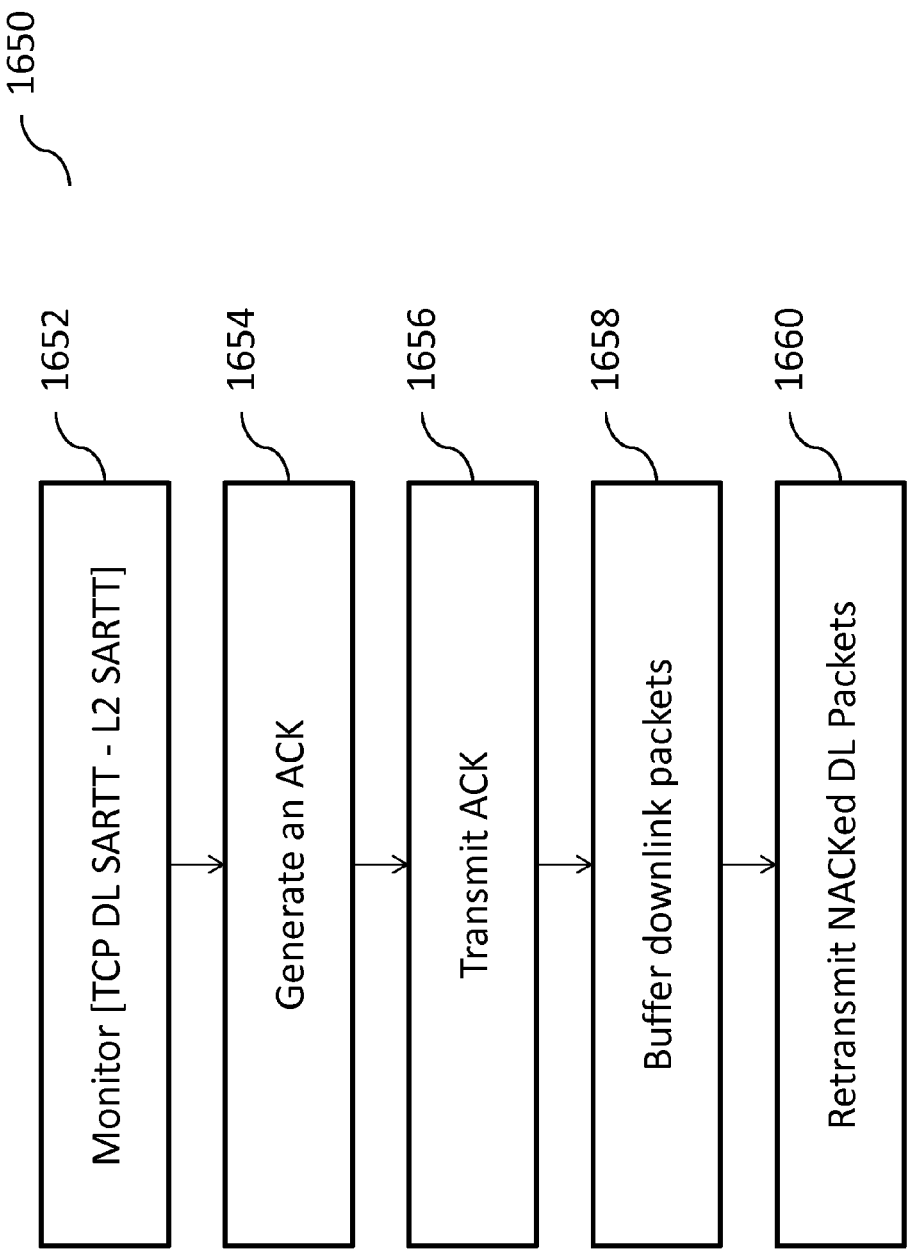
FIG. 16b illustrates an exemplary process for generating downlink acknowledgements locally, according to some implementations of the current subject matter.

In some implementations, to generate downlink acknowledgements locally, the eNodeB 1608 can perform an exemplary process 1650 shown in FIG. 16b. At 1652, the eNodeB 1608 can monitor [TCP SARTT−L2 SARTT] to determine whether this value is between the minimum and maximum threshold values. If [TCP SARTT−L2 SARTT] is greater than the maximum threshold value, the eNodeB 1608 can perform local ACK generation until [TCP SARTT−L2 SARTT] is less than or equal to $\text{Thresh}_{min}$. At 1654, the eNodeB 1608 can generate an ACK packet for transmission to the TCP transmitter 1604. The ACK packet can be generated based on port identifiers ("port ID"), IP addresses of the TCP receiver, and/or any other information that can identify the packets. The eNodeB 1608 can monitor downlink data packets and uplink ACK data packet response that is received from the TCP receiver 1602 to determine this information and to generate an appropriate ACK packet for sending to the TCP transmitter 1604. Further, the eNodeB 1608 can generate the ACK packet based on a layer 2 acknowledgement signals that it receives from the layer 2 acknowledgement signals that are indicative of a successful delivery to a peer of the TCP receiver 1602.

Once ACK packet is generated by the eNodeB 1608, the eNodeB 1608 can transmit the ACK packet to the TCP transmitter 1604, at 1656, at a rate based on the layer 2 acknowledgement signals. At 1658, the eNodeB 1608 can continue buffering the downlink data packets until a positive ACK data packet is received from the TCP receiver 1602. At 1660, the eNodeB 1608, upon receiving a negative acknowledgement ("NACK") from the TCP 1602 receiver, can retransmit data packets locally using the data stored in the local buffer of the eNodeB 1608.

Figure 17:
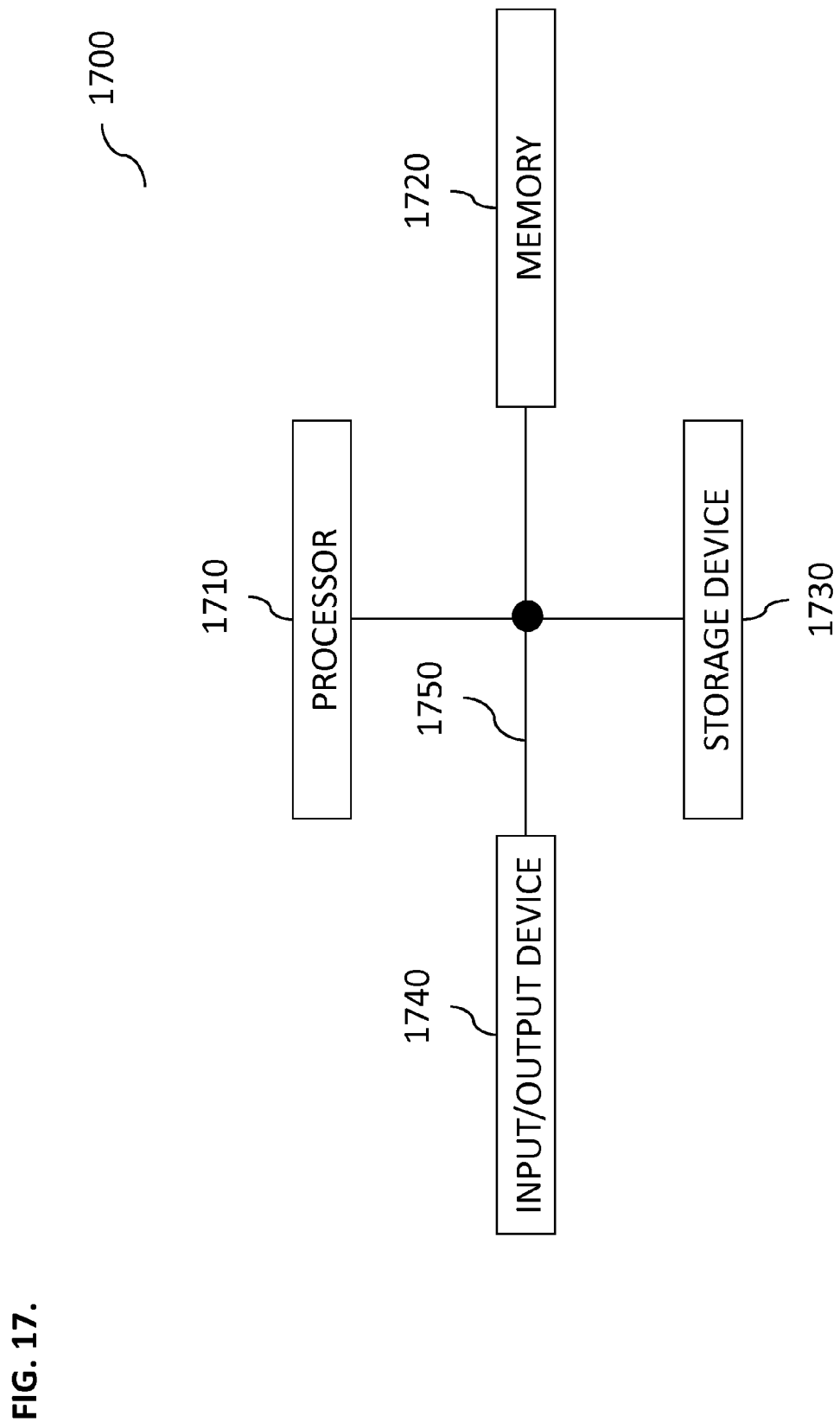
FIG. 17 illustrates an exemplary system, according to some implementations of the current subject matter.

In some implementations, the current subject matter can be configured to be implemented in a system 1700, as shown in FIG. 17. The system 1700 can include one or more of a processor 1710, a memory 1720, a storage device 1730, and an input/output device 1740. Each of the components 1710, 1720, 1730 and 1740 can be interconnected using a system bus 1750. The processor 1710 can be configured to process instructions for execution within the system 400. In some implementations, the processor 1710 can be a single-threaded processor. In alternate implementations, the processor 1710 can be a multi-threaded processor. The processor 1710 can be further configured to process instructions stored in the memory 1720 or on the storage device 1730, including receiving or sending information through the input/output device 1740. The memory 1720 can store information within the system 1700. In some implementations, the memory 1720 can be a computer-readable medium. In alternate implementations, the memory 1720 can be a volatile memory unit. In yet some implementations, the memory 1720 can be a non-volatile memory unit. The storage device 1730 can be capable of providing mass storage for the system 1700. In some implementations, the storage device 1730 can be a computer-readable medium. In alternate implementations, the storage device 1730 can be a floppy disk device, a hard disk device, an optical disk device, a tape device, non-volatile solid state memory, or any other type of storage device. The input/output device 1740 can be configured to provide input/output operations for the system 1700. In some implementations, the input/output device 1740 can include a keyboard and/or pointing device. In alternate implementations, the input/output device 1740 can include a display unit for displaying graphical user interfaces.

Figure 18:
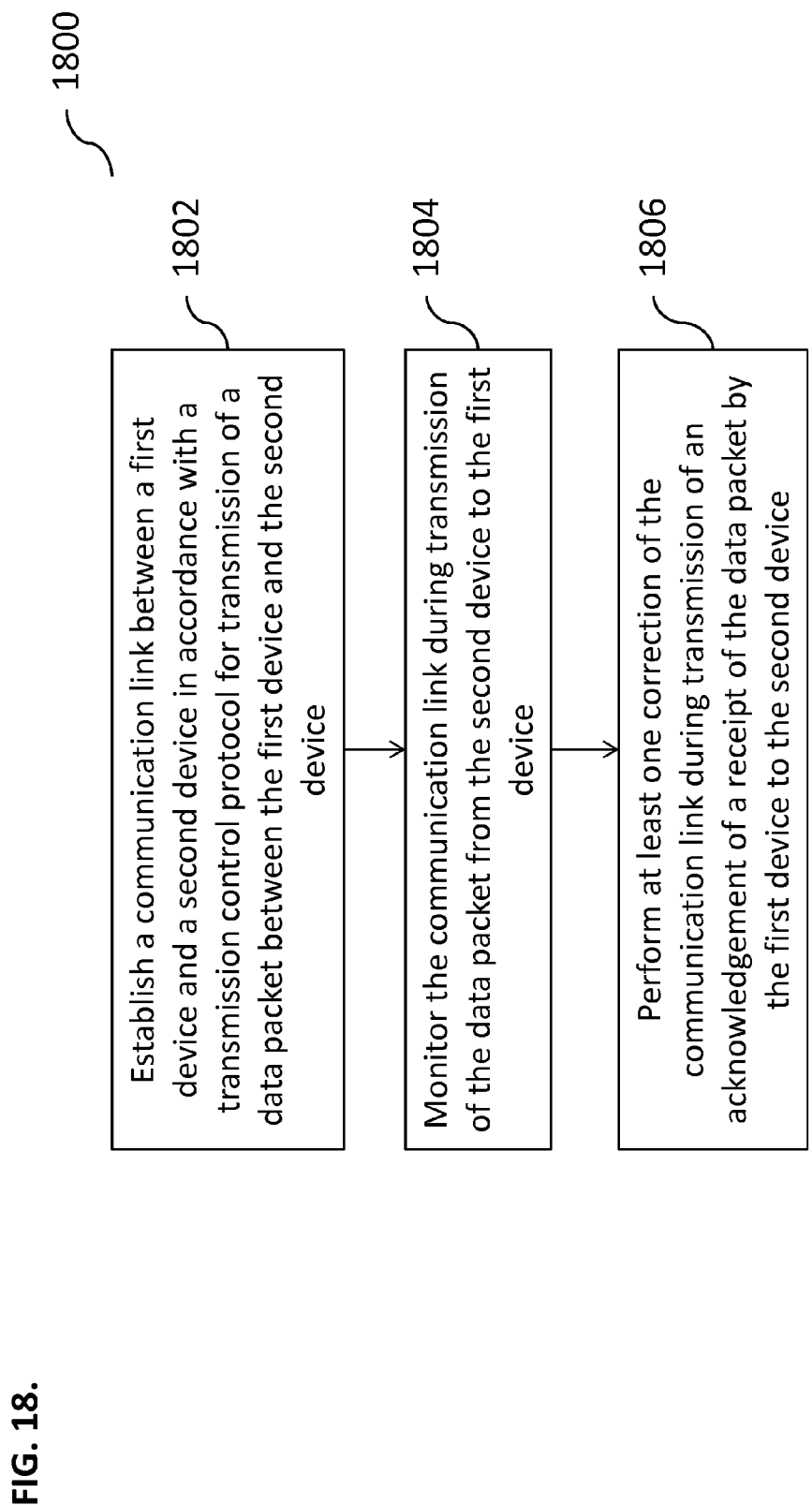
FIG. 18 illustrates an exemplary method, according to some implementations of the current subject matter.

FIG. 18 illustrates an exemplary method 1800 for optimization of a downlink throughput, according to some implementations of the current subject matter. At 1802, a communication link between a first device (e.g., a user equipment) and a second device (e.g., a server) in accordance with a transmission control protocol for transmission of a data packet between the first device and the second device can be established. At 1804, the communication link can be monitored during transmission of the data packet from the second device to the first device (e.g., on the downlink). At 1806, at least one correction of the communication link (e.g., uplink treatment) during transmission of an acknowledgement of a receipt of the data packet by the first device to the second device can be performed.

In some implementations, the current subject matter can include one or more of the following optional features. An evolved node ("eNodeB") (e.g., an eNodeB shown in FIGS. 1-16) base station can perform at least one of the establishing, the monitoring and the performing, the eNodeB base station comprising the at least one processor and the at least one memory. The method can also include storing, using the at least one memory, data packets received from the second device, the stored data packets include at least one transmission control protocol (TCP) data packet. The method can include transmitting at least one data packet stored in the at least one memory from the base station to the first device, and receiving at least one acknowledgement from the first device indicating that the data packet is received by the first device.

In some implementations, the monitoring can include determining, using the at least one processor, a smoothed TCP air-interface round trip time information for the data packet, the round trip time information includes time taken by a transmission of the data packet to the first device and a transmission of a TCP acknowledgement by the first device indicative of the receipt of the data packet. A smoothed L2 air-interface round trip time information for the data packet can be also determined based on a layer 2 acknowledgement information. The difference between the determined TCP smoothed round trip time information and the determined L2 smoothed round trip time information (i.e., [TCP SARTT−L2 SARTT]) can be compared to a first threshold value (i.e., $Thresh_{max}$) and a second threshold value (i.e., $Thresh_{min}$), the first threshold value being greater than the second threshold value. This methodology of detecting downlink throughput deterioration can be advantageous in that it can only be at the eNodeB. Downlink throughput by itself might not be used as a metric because target throughputs are not known a priori for TCP flows. The achievable throughput can depend on RTT being experienced by individual flows making it impossible to use a TCP throughput as a metric for downlink deterioration. TCP layer RTT by itself might also not be a useful metric because RTT might grow due to additional delays, e.g., due to eNodeB loading. The current subject matter system can resolve these issues by using the difference between TCP and L2 air-interface RTT. Thus, any growth in this difference can be due to TCP layer issues and can automatically exclude any L2 delays.

In some implementations, at least one correction can be performed when the difference is at least one of the following: greater than the first threshold value, and/or lower than the second threshold value. The correction is not performed when the difference between the determined round trip time information and the determined smoothed round trip time information is greater than the second threshold value and lesser than the first threshold value.

In some implementations, the correction can include at least one of the following: delaying transmission of an acknowledgement that the data packet was received by a second device, dropping transmission of at least one data packet from the first device to the second device, reducing size of a data packet receive window provided to the first device from the second device, providing an explicit congestion notification information to second device, and generating an acknowledgement from the at least one processor indicating that the packet was received by the first device. The transmission of an acknowledgement that the data packet was received can be delayed by a greater amount of time when the difference between the determined round trip time information and the determined smoothed round trip time information is greater than the first threshold value (i.e., [TCP SARTT−L2 SARTT]>$Thresh_{max}$). Transmission of an acknowledgement that the data packet was received can be delayed by a less amount of time when the difference between the determined round trip time information and the determined smoothed round trip time information is less than the second threshold value (i.e., [TCP SARTT−L2 SARTT]<$Thresh_{min}$).

In some implementations, a number of packets dropped from transmission from the first device to the second device can be greater when the difference between the determined round trip time information and the determined smoothed round trip time information is greater than the first threshold value (i.e., [TCP SARTT−L2 SARTT]>$Thresh_{max}$). The number of packets dropped from transmission from the first device to the second device can be less when the difference between the determined round trip time information and the determined smoothed round trip time information is less than the second threshold value (i.e., [TCP SARTT−L2 SARTT]<Thresh$_{min}$).

In some implementations, the explicit congestion notification information can be provided when the difference between the determined round trip time information and the determined smoothed round trip time information is greater than the first threshold value (i.e., [TCP SARTT−L2 SARTT]>Thresh$_{max}$).

In some implementations, the acknowledgement from the at least one processor indicating that the packet was received by the first device can be generated based on a layer 2 acknowledgement received from the first device by the at least one processor.

In some implementations, the eNodeB can be configured to send to the second device an acknowledgement indicating a receipt of the data packet by the first device upon receiving a confirmation that the data packet was received by the first device, the confirmation being generated by at least one of the following: a media access control (MAC) layer of the eNodeB, a packet data convergence protocol (PDCP) layer of the eNodeB, and a radio link control (RLC) layer of the eNodeB. The eNodeB can be further configured to schedule transmission of the data packet from the second device to the first device using the transmission control protocol.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method for transmission of data packets, the method comprising:
   establishing a communication link between a first device and a second device in accordance with a transmission control protocol for transmission of a data packet between the first device and the second device;
   monitoring the communication link during transmission of the data packet from the second device to the first device, wherein the monitoring includes
      determining, using at least one processor, a round trip time information for the data packet, the round trip time information includes time taken by a transmission of the data packet to the first device and a transmission of an acknowledgement by the first device indicative of the receipt of the data packet at the TCP layer; and
      determining, using the at least one processor, a smoothed round trip time information for the data packet based on a layer 2 acknowledgement information;
      comparing a difference between the determined TCP round trip time information and the determined smoothed L2 round trip time information to a first threshold value and a second threshold value, the first threshold value being greater than the second threshold value; and
   performing, based on the monitoring, at least one correction of the communication link during transmission of the acknowledgement of the receipt of the data packet by the first device to the second device;
   wherein the at least one correction includes at least one of the following: delaying transmission of the acknowledgement that the data packet was received, dropping transmission of at least one data packet from the first device to the second device, reducing size of a data packet receive window provided to the second device from the first device, providing an explicit congestion notification information, generating an acknowledgement from the at least one processor indicating that the packet was received by the first device, and any combination thereof;
   wherein at least one of the establishing, the monitoring, and the performing is performed using at least one processor of at least one computing system.

2. The method according to claim 1, wherein an evolved node (eNodeB) base station performs at least one of the establishing, the monitoring and the performing, the eNodeB base station comprising the at least one processor and the at least one memory.

3. The method according to claim 2, further comprising storing, using the at least one memory, data packets received from the second device, the stored data packets include at least one transmission control protocol (TCP) data packet.

4. The method according to claim 3, further comprising transmitting, using the at least one processor, at least one data packet stored in the at least one memory from the base station to the first device.

5. The method according to claim 3, further comprising receiving, using the at least one processor, at least one acknowledgement from the first device indicating that the data packet is received by the first device.

6. The method according to claim 2, wherein the performing further comprises
   performing the at least one correction when the difference between the determined TCP round trip time information and the determined L2 smoothed round trip time information is greater than the first threshold value;
   not performing the at least one correction when the difference between the determined TCP round trip time information and the determined L2 smoothed round trip time information is lesser than the second threshold value.

7. The method according to claim 6, wherein
   the transmission of an acknowledgement that the data packet was received is delayed by a greater amount of time when the difference between the determined TCP round trip time information and the determined L2 smoothed round trip time information is greater than the first threshold value;
   the transmission of an acknowledgement that the data packet was received is delayed by a less amount of time when the difference between the determined TCP round trip time information and the determined L2 smoothed round trip time information is less than the second threshold value.

8. The method according to claim 6, wherein
   a number of packets dropped from transmission from the first device to the second device is greater when the difference between the determined TCP round trip time information and the determined L2 smoothed round trip time information is greater than the first threshold value;
   the number of packets dropped from transmission from the first device to the second device is less when the difference between the determined TCP round trip time information and the determined L2 smoothed round trip time information is less than the second threshold value.

9. The method according to claim 6, wherein
   the explicit congestion notification information is provided when the difference between the determined TCP round trip time information and the determined L2 smoothed round trip time information is greater than the first threshold value.

10. The method according to claim 6, wherein the acknowledgement from the at least one processor indicating that the packet was received by the first device is generated based on a layer 2 acknowledgement received from the first device by the at least one processor.

11. The method according to claim 2, wherein the at least one processor being configured to send to the second device an acknowledgement indicating a receipt of the data packet by the first device upon receiving a confirmation that the data packet was received by the first device, the confirmation being generated by at least one of the following: a media access control (MAC) layer of the eNodeB, a packet data convergence protocol (PDCP) layer of the eNodeB, and a radio link control (RLC) layer of the eNodeB.

12. The method according to claim 2, wherein the at least one processor being configured to schedule transmission of the data packet from the second device to the first device using the transmission control protocol.

13. A device for transmission of data packets, comprising:
at least one memory; and
at least one processor operatively coupled to the memory, the at least one processor being configured to:
establish a communication link between a first device and a second device in accordance with a transmission control protocol for transmission of a data packet between the first device and the second device;
monitor the communication link during transmission of the data packet from the second device to the first device, wherein the monitoring includes
determining, using the at least one processor, a round trip time information for the data packet, the round trip time information includes time taken by a transmission of the data packet to the first device and a transmission of an acknowledgement by the first device indicative of the receipt of the data packet at the TCP layer; and
determining, using the at least one processor, a smoothed round trip time information for the data packet based on a layer 2 acknowledgement information;
comparing a difference between the determined TCP round trip time information and the determined smoothed L2 round trip time information to a first threshold value and a second threshold value, the first threshold value being greater than the second threshold value; and
perform, based on the monitoring, at least one correction of the communication link during transmission of the acknowledgement of the receipt of the data packet by the first device to the second device;
wherein the at least one correction includes at least one of the following: delaying transmission of the acknowledgement that the data packet was received, dropping transmission of at least one data packet from the first device to the second device, reducing size of a data packet receive window provided to the second device from the first device, providing an explicit congestion notification information, generating an acknowledgement from the at least one processor indicating that the packet was received by the first device, and any combination thereof.

14. The device according to claim 13, wherein an evolved node (eNodeB) base station, including the at least one memory and the at least one processor, performs at least one of the establishing, the monitoring and the performing, the eNodeB base station comprising the at least one processor and the at least one memory.

15. The device according to claim 14, wherein, using the at least one memory, data packets received from the second device are stored, the stored data packets include at least one transmission control protocol (TCP) data packet.

16. The device according to claim 15, wherein the at least one processor is further configured to
transmit at least one data packet stored in the at least one memory from the base station to the first device.

17. The device according to claim 15, wherein the at least one processor is further configured to
receive at least one acknowledgement from the first device indicating that the data packet is received by the first device.

18. The device according to claim 14, wherein the performing further comprises
performing the at least one correction when the difference between the determined TCP round trip time information and the determined L2 smoothed round trip time information is greater than the first threshold value;
not performing the at least one correction when the difference between the determined TCP round trip time information and the determined L2 smoothed round trip time information is lesser than the second threshold value.

19. The device according to claim 18, wherein
the transmission of an acknowledgement that the data packet was received is delayed by a greater amount of time when the difference between the determined TCP round trip time information and the determined L2 smoothed round trip time information is greater than the first threshold value;
the transmission of an acknowledgement that the data packet was received is delayed by a less amount of time when the difference between the determined TCP round trip time information and the determined L2 smoothed round trip time information is less than the second threshold value.

20. The device according to claim 18, wherein
a number of packets dropped from transmission from the first device to the second device is greater when the difference between the determined TCP round trip time information and the determined L2 smoothed round trip time information is greater than the first threshold value;
the number of packets dropped from transmission from the first device to the second device is less when the difference between the determined TCP round trip time information and the determined L2 smoothed round trip time information is less than the second threshold value.

21. The device according to claim 18, wherein
the explicit congestion notification information is provided when the difference between the determined TCP round trip time information and the determined L2 smoothed round trip time information is greater than the first threshold value.

22. The device according to claim 18, wherein the acknowledgement from the at least one processor indicating that the packet was received by the first device is generated based on a layer 2 acknowledgement received from the first device by the at least one processor.

23. The device according to claim 14, wherein the at least one processor being configured to send to the second device an acknowledgement indicating a receipt of the data packet by the first device upon receiving a confirmation that the data packet was received by the first device, the confirmation being generated by at least one of the following: a media access control (MAC) layer of the eNodeB, a packet data convergence protocol (PDCP) layer of the eNodeB, and a radio link control (RLC) layer of the eNodeB.

24. The device according to claim 14, wherein the at least one processor being configured to schedule transmission of the data packet from the second device to the first device using the transmission control protocol.

25. A computer program product, for transmitting data packets, comprising a non-transitory machine-readable medium storing instructions that, when executed by at least one programmable processor, cause the at least one programmable processor to perform operations comprising:
    establishing a communication link between a first device and a second device in accordance with a transmission control protocol for transmission of a data packet between the first device and the second device;
    monitoring the communication link during transmission of the data packet from the second device to the first device, wherein the monitoring includes
        determining, using the at least one processor, a round trip time information for the data packet, the round trip time information includes time taken by a transmission of the data packet to the first device and a transmission of an acknowledgement by the first device indicative of the receipt of the data packet at the TCP layer; and
        determining, using the at least one processor, a smoothed round trip time information for the data packet based on a layer 2 acknowledgement information;
    comparing a difference between the determined TCP round trip time information and the determined smoothed L2 round trip time information to a first threshold value and a second threshold value, the first threshold value being greater than the second threshold value; and
    performing, based on the monitoring, at least one correction of the communication link during transmission of the acknowledgement of the receipt of the data packet by the first device to the second device;
    wherein the at least one correction includes at least one of the following: delaying transmission of the acknowledgement that the data packet was received, dropping transmission of at least one data packet from the first device to the second device, reducing size of a data packet receive window provided to the second device from the first device, providing an explicit congestion notification information, generating an acknowledgement from the at least one processor indicating that the packet was received by the first device, and any combination thereof.

26. The computer program product according to claim 25, wherein an evolved node (eNodeB) base station, including the at least one memory and the at least one processor, performs at least one of the establishing, the monitoring and the performing, the eNodeB base station comprising the at least one processor and the at least one memory.

27. The computer program product according to claim 26, wherein the operations further comprise storing data packets received from the second device, the stored data packets include at least one transmission control protocol (TCP) data packet.

28. The computer program product according to claim 27, wherein the operations further comprise transmitting at least one data packet stored in the at least one memory from the base station to the first device.

29. The computer program product according to claim 27, wherein the operations further comprise receiving at least one acknowledgement from the first device indicating that the data packet is received by the first device.

30. The computer program product according to claim 26, wherein the performing further comprises
    performing the at least one correction when the difference between the determined round trip time information and the determined smoothed round trip time information is greater than the first threshold value;
    not performing the at least one correction when the difference between the determined round trip time information and the determined smoothed round trip time information is lesser than the second threshold value.

31. The computer program product according to claim 30, wherein
    the transmission of an acknowledgement that the data packet was received is delayed by a greater amount of time when the difference between the determined round trip time information and the determined smoothed round trip time information is greater than the first threshold value;
    the transmission of an acknowledgement that the data packet was received is delayed by a less amount of time when the difference between the determined round trip time information and the determined smoothed round trip time information is less than the second threshold value.

32. The computer program product according to claim 30, wherein
    a number of packets dropped from transmission from the first device to the second device is greater when the difference between the determined round trip time information and the determined smoothed round trip time information is greater than the first threshold value;
    the number of packets dropped from transmission from the first device to the second device is less when the difference between the determined round trip time information and the determined smoothed round trip time information is less than the second threshold value.

33. The computer program product according to claim 30, wherein
    the explicit congestion notification information is provided when the difference between the determined round trip time information and the determined smoothed round trip time information is greater than the first threshold value.

34. The computer program product according to claim 30, wherein the acknowledgement from the at least one processor indicating that the packet was received by the first device is generated based on a layer 2 acknowledgement received from the first device by the at least one processor.

35. The computer program product according to claim 26, wherein the operations further comprise sending to the second device an acknowledgement indicating a receipt of the data packet by the first device upon receiving a confirmation that the data packet was received by the first device, the confirmation being generated by at least one of the following: a media access control (MAC) layer of the eNodeB, a packet data convergence protocol (PDCP) layer of the eNodeB, and a radio link control (RLC) layer of the eNodeB.

36. The computer program product according to claim 26, wherein the operations further comprise scheduling transmission of the data packet from the second device to the first device using the transmission control protocol.

* * * * *